United States Patent
Choi et al.

(10) Patent No.: US 9,774,883 B2
(45) Date of Patent: Sep. 26, 2017

(54) MULTIVIEW VIDEO ENCODING METHOD AND DEVICE, AND MULTIVIEW VIDEO DECODING METHOD AND DEVICE

(71) Applicant: SAMSUNG ELECTRONICS CO., LTD., Suwon-si (KR)

(72) Inventors: Byeong-doo Choi, Siheung-si (KR); Jae-hyun Kim, Seoul (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 331 days.

(21) Appl. No.: 14/521,817

(22) Filed: Oct. 23, 2014

(65) Prior Publication Data
US 2015/0049803 A1 Feb. 19, 2015

Related U.S. Application Data

(63) Continuation of application No. PCT/KR2013/003472, filed on Apr. 23, 2013.
(Continued)

(51) Int. Cl.
H04N 19/597 (2014.01)
H04N 21/2343 (2011.01)
H04N 21/236 (2011.01)
H04N 21/2365 (2011.01)
H04N 21/2381 (2011.01)
(Continued)

(52) U.S. Cl.
CPC .......... *H04N 19/597* (2014.11); *H04N 19/30* (2014.11); *H04N 19/46* (2014.11); *H04N 19/70* (2014.11); *H04N 21/2365* (2013.01); *H04N 21/2381* (2013.01); *H04N 21/23614* (2013.01);
(Continued)

(58) Field of Classification Search
CPC combination set(s) only.
See application file for complete search history.

(56) References Cited

U.S. PATENT DOCUMENTS 8,369,408 B2 2/2013 Kim et al.
8,369,414 B2 2/2013 Lim et al.
(Continued)

FOREIGN PATENT DOCUMENTS

CN 102265617 A 11/2011
KR 10-2011-0002843 A 1/2001
(Continued)

OTHER PUBLICATIONS

International Search Report dated Aug. 26, 2013 issued by Korean Intellectual Property Office in counterpart Korean Patent Application No. PCT/KR2013/003472.
(Continued)

*Primary Examiner* — Sath V Perungavoor
*Assistant Examiner* — Janese Duley
(74) *Attorney, Agent, or Firm* — Sughrue Mion, PLLC

(57) ABSTRACT

A multi-view video encoding method multiplexes an encoded multi-view image by a predetermined data unit and adds a scalable extension type (SET) indicating which view of image among a basic view image and an additional view image is related to data included in the predetermined data unit, a depth flag indicating which image is related to the data among a texture image and a depth map image, and a view ID of the data to a header of the predetermined data unit.

12 Claims, 21 Drawing Sheets

Related U.S. Application Data

(60) Provisional application No. 61/636,900, filed on Apr. 23, 2012.

(51) Int. Cl.
*H04N 19/70* (2014.01)
*H04N 19/46* (2014.01)
*H04N 19/30* (2014.01)
*H04N 21/81* (2011.01)
*H04N 21/845* (2011.01)

(52) U.S. Cl.
CPC ... *H04N 21/234327* (2013.01); *H04N 21/816* (2013.01); *H04N 21/8451* (2013.01)

(56) References Cited

U.S. PATENT DOCUMENTS

| | | |
|---|---|---|
| 8,750,632 B2 | 6/2014 | Nakamura et al. |
| 8,855,200 B2 | 10/2014 | Koo et al. |
| 2008/0317124 A1 | 12/2008 | Cho et al. |
| 2010/0098154 A1 | 4/2010 | Lou et al. |
| 2010/0142625 A1 | 6/2010 | Lee et al. |
| 2010/0250764 A1 | 9/2010 | Vare et al. |
| 2011/0255796 A1* | 10/2011 | Nakamura ........... H04N 19/597 382/232 |
| 2012/0023155 A1 | 1/2012 | Myers et al. |
| 2012/0106634 A1 | 5/2012 | Jeon et al. |
| 2012/0229602 A1* | 9/2012 | Chen ................... H04N 19/597 348/43 |
| 2013/0212291 A1 | 8/2013 | Lee et al. |

FOREIGN PATENT DOCUMENTS

| | | |
|---|---|---|
| KR | 10-2007-0111880 A | 11/2007 |
| KR | 10-2008-0055686 A | 6/2008 |
| KR | 10-2008-0114500 A | 12/2008 |
| KR | 10-2010-0073772 A | 7/2010 |
| KR | 10-2012-0015260 A | 2/2012 |
| KR | 10-2012-0027194 A | 3/2012 |
| WO | 2007/114608 A1 | 10/2007 |

OTHER PUBLICATIONS

Written Opinion dated Aug. 26, 2013 issued by International Searching Authority in counterpart International Application No. PCT/KR2013/003472.

Communication issued Aug. 20, 2015, issued by the European Patent Office in counterpart European Patent Application No. 13780709.5.

Choi, B., et al. "NAL unit header for scalable extension", JCT-VC, 9th Meeting, Apr. 27, 2012-May 7, 2012, 5 pages total, Geneva, Switzerland, XP030111895.

Boyce, J., et al, "Information for scalable extension high layer syntax", JCT-VC, 8th Meeting, Feb. 1, 2012-Feb. 10, 2012, 7 pages total, San Jose, California, XP030111413.

Grunberg, K., et al., "Deliverable D3.2 MVC/SVC storage format", SEA Consortium, Jan. 29, 2009, pp. 1-34, XP002599508.

Sjoberg, R., et al., "High-Level Syntax for Bitstream Extraction" JCT-VC, 7th Meeting, Nov. 21, 2011-Nov. 30, 2011, 14 pages total, Geneva, Switzerland, XP030110591.

Choi, B., et al. "3D-HEVC HLS: On NAL unit header design", International Organization for Standardization, Apr. 2012, 5 pages total, Geneva Switzerland.

Communication issued Apr. 26, 2017 by the State Intellectual Property Office of P.R. China in counterpart Chinese Patent Application No. 201380033261.7.

* cited by examiner

CODING UNIT (1010)

FIG. 20A
| nal_unit_header( ) { | Descriptor |
|---|---|
| forbidden_zero_bit | f(1) |
| nal_unit_type | u(6) |
| reserved_zero_6bits | u(6) |
| temporal_id | u(3) |
| } | |
FIG. 20B
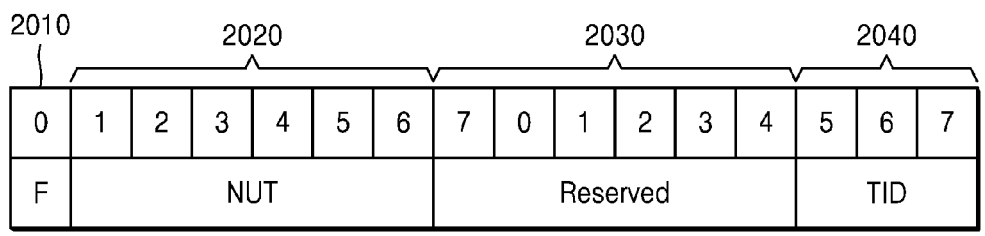
FIG. 21
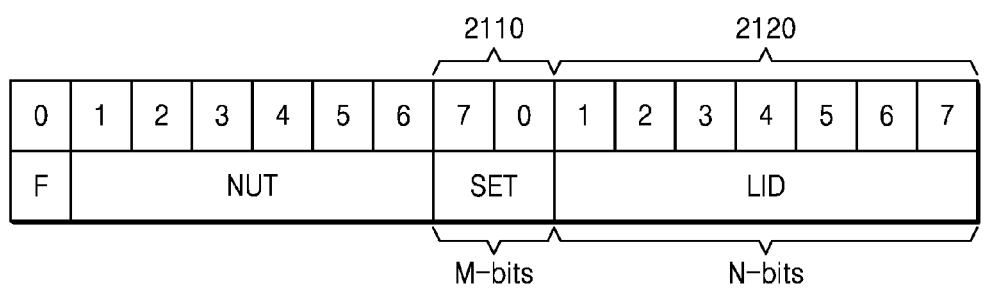

| Layer ID(SET=k) | Dependency ID | Quality ID | View ID | Temporal ID |
|---|---|---|---|---|
| 0 | 0 | 0 | 0 | 0 |
| 1 | 1 | 0 | 0 | 0 |
| 2 | 2 | 0 | 0 | 0 |
| 3 | 3 | 0 | 0 | 0 |
| 4 | 3 | 1 | 0 | 0 |
| 5 | 4 | 0 | 0 | 0 |
| 6 | 1 | 0 | 1 | 0 |
| 7 | 1 | 0 | 1 | 1 |
| ... | ... | ... | ... | ... |

2210 points to row with Layer ID 6.

| SET (2bits) | Sub layer ID0 | Sub layer ID1 |
|---|---|---|
| 0 | Priority_id | |
| 1 | View_id | temporal_id |
| 2 | dependency_id | quality_id |
| 3 | dependency_id | temporal_id |

| SET (2bits) | 2610 | | 2620 |
|---|---|---|---|
| 0 | Reserved | | |
| 1 | depth_flag (1bits) | | view_id (5bits) |
| 2 | Reserved | | |
| 3 | depth_flag (1bits) | 1bits | temporal_id (3bits) |

| nal_unit( ) { | Descriptor |
|---|---|
|     forbidden_zero_bit | f(1) |
|     nal_unit_type | u(6) |
|     scalable_extension_type | u(2) |
|     depth_flag | u(1) |
|     view_id | u(5) |
|     ......... | |
| } | |

FIG. 28

| nal_unit( ) { | Descriptor |
|---|---|
|     forbidden_zero_bit | f(1) |
|     nal_unit_type | u(6) |
|     scalable_extension_type | u(2) |
|     if(scalable_extension_type==1){ | u(5) |
|         depth_flag | |
|         view_id | |
|     } else if(scalable_extension_type==3) | |
|         temporal_id | |
|     ... | |
| } | |

MULTIVIEW VIDEO ENCODING METHOD AND DEVICE, AND MULTIVIEW VIDEO DECODING METHOD AND DEVICE

CROSS-REFERENCE TO RELATED PATENT APPLICATION

The present application is a bypass continuation application that claims priority from International Application No. PCT/KR2013/003472, filed on Apr. 23, 2013, and claims the benefit of U.S. Provisional Application No. 61/636,900, filed on Apr. 23, 2012, in the U.S. Patent and Trademark Office, the disclosures of which are incorporated herein by reference in their entireties.

BACKGROUND

1. Field

Methods and apparatuses consistent with exemplary embodiments of the present application relate to encoding and decoding scalable video and multi-view video, and more particularly to scalability of scalable video and multi-view video and a high-level syntax structure for signaling multi-view information.

2. Description of Related Art

In general, image data is encoded by a codec according to a predetermined data compression standard, for example, the Moving Picture Expert Group (MPEG) standard. The encoded image data is then stored in an information storage medium in the form of a bitstream or transmitted via a communication channel.

Scalable video coding (SVC), as a video compression method, appropriately adjusts and transmits an amount of information in accordance with various communication networks and terminals. SVC thereby provides a video encoding method of adaptively providing a service to various transmission networks and various receiving terminals by using a single video stream.

A multi-view video coding technology is widely used for 3D video coding because of the popularity of a 3D multimedia device and 3D multimedia content.

Such conventional SVC or multi-view video coding encodes video by using a limited encoding method based on a macroblock of a predetermined size.

SUMMARY

Aspects of exemplary embodiments provide a structure of a network abstraction layer (NAL) data unit for compatibility with the NAL data unit according to a conventional image compression format and signaling information about multi-view video and scalable video.

Aspects of exemplary embodiments also provide methods and apparatuses for encoding and decoding scalable video and multi-view video by using information about multi-view video and scalable video.

According to aspects of the exemplary embodiments, a region of a predetermined data unit is redefined as a region for scalability extension information or multi-view extension information.

According to the aspects of the exemplary embodiments, an NAL unit having a subordinate compatibility with an NAL unit according to a conventional image compression format may be used to signal information about multi-view video and scalable video.

According to an aspect of an exemplary embodiment, there is provided a multi-view video encoding method including: encoding a multi-view image included in a multi-view video; multiplexing the encoded multi-view image by a predetermined data unit; and adding a scalable extension type (SET) indicating which view of image among a basic view image and an additional view image is related to data included in the predetermined data unit, a depth flag indicating which image is related to the data among a texture image and a depth map image, and a view identifier (ID) of the data to a header of the predetermined data unit.

According to another aspect of an exemplary embodiment, there is provided a multi-view video encoding apparatus including: an image encoder configured to encode a multi-view image included in a multi-view video; and an output unit configured to multiplex the encoded multi-view image by a predetermined data unit and add a scalable extension type (SET) indicating which view of image among a basic view image and an additional view image is related to data included in the predetermined data unit, a depth flag indicating which image is related to the data among a texture image and a depth map image, and a view identifier (ID) of the data to a header of the predetermined data unit.

According to another aspect of an exemplary embodiment, there is provided a multi-view video decoding method including: receiving a bitstream comprising a predetermined data unit multiplexed from encoded multi-view image data; obtaining a scalable extension type (SET) indicating which view of image among a basic view image and an additional view image is related to data included in the predetermined data unit, a depth flag indicating which image is related to the data among a texture image and a depth map image, and a view ID of the data from a header of the predetermined data unit from the bitstream; and determining an SET of the data included in the predetermined data unit, whether the data is the texture image or the depth map image, and a view of the data, based on the obtained information.

According to another aspect of an exemplary embodiment, there is provided a multi-view video decoding apparatus including: a receiver configured to receive a bitstream comprising a predetermined data unit multiplexed from encoded multi-view image data and obtain a scalable extension type (SET) indicating which view of image among a basic view image and an additional view image is related to data included in the predetermined data unit, a depth flag indicating which image is related to the data among a texture image and a depth map image, and a view ID of the data from a header of the predetermined data unit from the bitstream; and an image decoder configured to determine an SET of the data included in the predetermined data unit, whether the data is the texture image or the depth map image, and a view of the data, based on the obtained information.

BRIEF DESCRIPTION OF THE DRAWINGS

FIGS. 20A and 20B illustrate examples of a header of a network abstraction layer (NAL) unit according to exemplary embodiments;

FIG. 21 illustrates a header of an NAL unit for a scalable extension according to an exemplary embodiment;

FIG. 27 is a table of a syntax structure of an NAL unit for a multi-view extension, according to an exemplary embodiment;

FIG. 28 is a table of a syntax structure of an NAL unit for a multi-view extension, according to another exemplary embodiment;

DETAILED DESCRIPTION OF EXEMPLARY EMBODIMENTS

A video encoding method and a video decoding method based on coding units having a tree structure, according to exemplary embodiments, will be described with reference to FIGS. 1 through 13. A multi-view video encoding method and a multi-view video decoding method based on coding units having a tree structure, according to exemplary embodiments, will be described with reference to FIGS. 14 through 31.

The video encoding method and the video decoding method based on the coding units having the tree structure, according to exemplary embodiments, will be described with reference to FIGS. 1 through 13 below.

Figure 1:
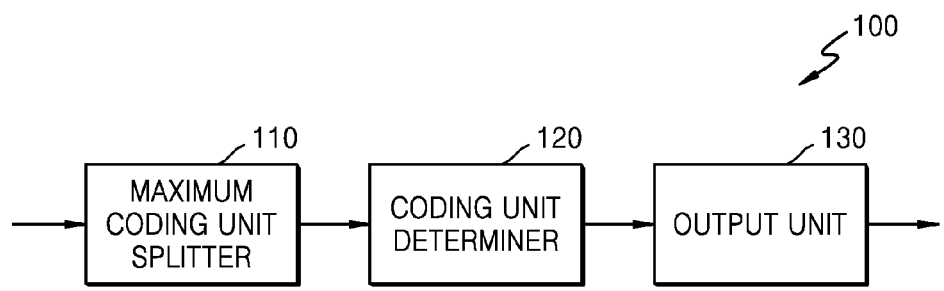
FIG. 1 is a block diagram of a video encoding apparatus based on coding units having a tree structure, according to an exemplary embodiment.

FIG. 1 is a block diagram of a video encoding apparatus 100 based on coding units having a tree structure, according to an exemplary embodiment.

The video encoding apparatus 100 according to an exemplary embodiment includes a maximum coding unit splitter 110, a coding unit determiner 120, and an output unit 130. Hereinafter, for convenience of description, the video encoding apparatus 100, according to an exemplary embodiment, is referred to as a "video encoding apparatus 100". The video encoding apparatus 100 may be accompanied by video prediction based on coding units having a tree structure.

The maximum coding unit splitter 110 may split a current picture based on a maximum coding unit that is a coding unit having a maximum size for the current picture of an image. If a size of the current picture is larger than the size of the maximum coding unit, image data of the current picture may be split into the at least one maximum coding unit. The maximum coding unit according to an exemplary embodiment may be a data unit having a size of 32×32, 64×64, 128×128, or 256×256, wherein a shape of the data unit is a square having a width and length in squares of 2 (i.e., $2^N$). The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth increases, deeper coding units according to depths may be split from the maximum coding unit to a minimum coding unit. A depth of the maximum coding unit is an uppermost depth and a depth of the minimum coding unit is a lowermost depth. Because a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Because the maximum coding unit according to an exemplary embodiment is split according to depths, the image data of a spatial domain included in the maximum coding unit may be hierarchically classified according to depths.

A maximum depth and a maximum size of a coding unit, which limit a total number of times a height and a width of the maximum coding unit are hierarchically split, may be previously set.

The coding unit determiner 120 encodes at least one split region obtained by splitting a region of the maximum coding unit according to depths, and determines a depth to output final encoding results according to the at least one split region. In other words, the coding unit determiner 120 determines a coded depth by encoding the image data in the deeper coding units according to depths, according to the maximum coding unit of the current picture, and selecting a depth having a smallest encoding error. The determined coded depth and the image data according to the maximum coding unit are output.

The image data in the maximum coding unit is encoded based on the deeper coding units corresponding to at least one depth equal to or less than the maximum depth, and encoding results are compared based on each of the deeper coding units. A depth having the smallest encoding error may be selected after comparing encoding errors of the deeper coding units. At least one coded depth may be selected for each maximum coding unit.

A size of the maximum coding unit is split as a coding unit is hierarchically split according to depths, and a number of coding units increases. Also, even if coding units correspond to the same depth in one maximum coding unit, it is determined whether to split each of the coding units corresponding to the same depth to a lower depth by measuring an encoding error of the data of each coding unit, separately. Accordingly, even when data is included in one maximum coding unit, the encoding errors according to depths may differ according to regions, and thus the coded depths may differ according to regions. Thus, one or more coded depths may be set for one maximum coding unit, and the data of the maximum coding unit may be divided according to coding units of the one or more coded depths.

Accordingly, the coding unit determiner 120 according to an exemplary embodiment may determine coding units having a tree structure included in a current maximum coding unit. The 'coding units having a tree structure' according to an exemplary embodiment include coding units corresponding to a depth determined to be a coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of times splitting is performed from a maximum coding unit to a minimum coding unit. A first maximum depth according to an exemplary embodiment may denote a total number of times splitting is performed from the maximum coding unit to the minimum coding unit. A second maximum depth according to an exemplary embodiment may denote a total number of depth levels from the maximum coding unit to the minimum coding unit. For example, when a depth of the maximum coding unit is 0, a depth of a coding unit in which the maximum coding unit is split once may be set to 1, and a depth of a coding unit in which the maximum coding unit is split twice may be set to 2. In this case, if the minimum coding unit is a coding unit obtained by splitting the maximum coding unit four times, 5 depth levels of depths 0, 1, 2, 3 and 4 exist, and thus the first maximum depth may be set to 4 and the second maximum depth may be set to 5.

Prediction encoding and frequency transformation may be performed according to the maximum coding unit. The prediction encoding and the transformation are also performed based on the deeper coding units according to a depth equal to or depths less than the maximum depth, according to the maximum coding unit.

Because a number of deeper coding units increases whenever the maximum coding unit is split according to depths, encoding including the prediction encoding and the frequency transformation is performed on all of the deeper coding units generated as the depth increases. For convenience of description, the prediction encoding and the frequency transformation will now be described based on a coding unit of a current depth, from among at least one maximum coding unit.

The video encoding apparatus 100 according to an exemplary embodiment may variously select a size or shape of a data unit for encoding the image data. In order to encode the image data, operations, such as prediction encoding, frequency transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit.

For example, when a coding unit of 2N×2N (where N is a positive integer) is no longer split, the coding unit may become a prediction unit of 2N×2N and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a smallest encoding error.

The video encoding apparatus 100 according to an exemplary embodiment may also perform the transformation on the image data in a coding unit based not only on the coding unit for encoding the image data but also based on a data unit that is different from the coding unit. In order to perform the transformation in the coding unit, the transformation may be performed based on a transformation unit having a size smaller than or equal to a size of the coding unit. For example, the transformation unit may include a transformation unit for an intra mode and a data unit for an inter mode.

Similar to the coding unit in a tree structure according to an exemplary embodiment, the transformation unit in the coding unit may be recursively split into smaller sized transformation units, and thus, residual data in the coding unit may be divided according to the transformation unit having a tree structure according to transformation depths.

A transformation depth indicating a number of times splitting is performed to reach the transformation unit by splitting the height and width of the coding unit may also be set in the transformation unit according to an exemplary embodiment. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth requires not only information about the coded depth but also about information related to prediction encoding and transformation. Accordingly, the coding unit determiner 120 not only determines a coded depth having a smallest encoding error but also determines a partition type in a prediction unit, a prediction mode according to prediction units, and a size of a transformation unit for transformation.

Coding units having a tree structure in a maximum coding unit and a method of determining a prediction unit/partition and a transformation unit according to an exemplary embodiment will be described in detail later with reference to FIGS. 3 through 13.

The coding unit determiner 120 may measure an encoding error of deeper coding units according to depths by using Rate-Distortion (RD) Optimization based on Lagrangian multipliers.

The output unit 130 outputs the image data of the maximum coding unit, which is encoded based on the at least one coded depth determined by the coding unit determiner 120, and information about the encoding mode according to the coded depth, in one or more bitstreams.

The encoded image data may be obtained by encoding residual data of an image.

The information about the encoding mode according to coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, the encoding is performed on the current coding unit of the current depth, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Because at least one coding unit of the lower depth exists in one coding unit of the current depth, the encoding is repeatedly performed on each coding unit of the lower depth, and thus the encoding may be recursively performed for the coding units having the same depth.

Because the coding units having a tree structure are determined for one maximum coding unit and information about at least one encoding mode is determined for a coding unit of a coded depth, information about at least one encoding mode may be determined for one maximum coding unit. Also, a coded depth of the data of the maximum coding unit may be different according to locations because the data is hierarchically split according to depths, and thus information about the coded depth and the encoding mode may be set for the data.

Accordingly, the output unit 130 according to an exemplary embodiment may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting a lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to deeper coding units according to depths, and encoding information according to prediction units. The encoding information according to the deeper coding units according to depths may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Also, information about a maximum size of the coding unit defined according to pictures, slices, or GOPs, and information about a maximum depth may be inserted into a header of a bitstream, a sequence parameter set, or a picture parameter set, etc.

Information about a maximum size of the transformation unit allowed for a current video and information about a minimum size of the transformation unit may be output through the header of the bitstream, the sequence parameter set, or the picture parameter set, etc. The output unit 130 may encode and output reference information, prediction information, unidirectional prediction information, slice-type information including a fourth slice type described with reference to FIG. 1 above.

In the video encoding apparatus 100, the deeper coding unit is a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of four coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, because encoding may be performed on each maximum coding unit by using any one of various prediction modes and transformations, an optimum encoding mode may be determined considering image characteristics of the coding unit of various image sizes.

Thus, if an image having high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100 according to an exemplary embodiment, image compression efficiency may be increased because a coding unit is adjusted while considering characteristics of an image while increasing a maximum size of a coding unit while considering a size of the image.

Figure 2:
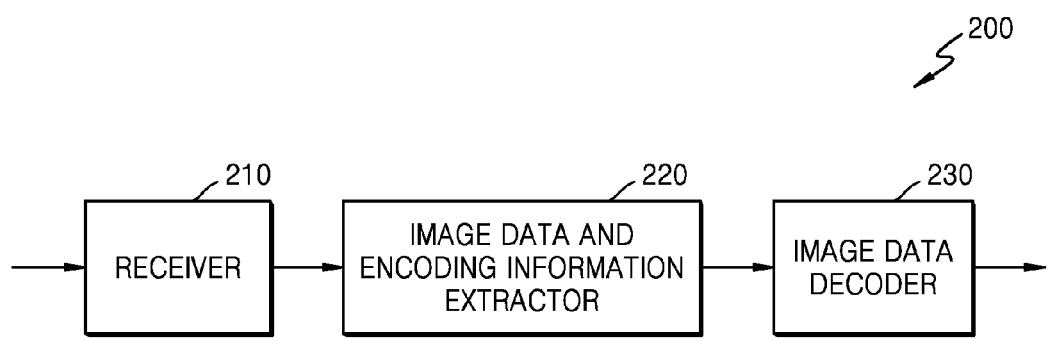
FIG. 2 is a block diagram of a video decoding apparatus based on coding units having a tree structure, according to an exemplary embodiment.

FIG. 2 is a block diagram of a video decoding apparatus 200 based on coding units having a tree structure, according to an exemplary embodiment.

The video decoding apparatus 200 includes a receiver 210, an image data and encoding information extractor 220, and an image data decoder 230. Hereinafter, for convenience of description, the video decoding apparatus 200 according to an exemplary embodiment is referred to as a "video decoding apparatus 200". The video decoding apparatus 200 may be accompanied by video prediction based on coding units having a tree structure.

Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, in which the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having the tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coded depth, and information about an encoding mode according to each coded depth may include information about a partition type of a corresponding coding unit corresponding to the coded depth, a prediction mode, and a size of a transformation unit. Also, split information according to depths may be extracted as the information about the coded depth.

The information about the coded depth and the encoding mode according to each maximum coding unit extracted by the image data and encoding information extractor 220 is information about a coded depth and an encoding mode determined to generate a smallest encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to an encoding mode that generates the smallest encoding error.

Because encoding information about the coded depth and the encoding mode according to an exemplary embodiment may be assigned to a predetermined data unit from among a corresponding coding unit, a prediction unit, and a minimum unit, the image data and encoding information extractor 220 may extract the information about the coded depth and the encoding mode according to the predetermined data units. When the information about the coded depth of the corresponding maximum coding unit and the encoding mode is recorded according to the predetermined data units, the predetermined data units having the same information about the coded depth and the encoding mode may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may read transformation unit information according to the tree structure according to coding units and perform inverse transformation based on each transformation unit in the coding unit, to perform the inverse transformation according to maximum coding units. A pixel value of the spatial region of the coding unit may be reconstructed.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data of the current depth by using the information about the partition type of the prediction unit, the prediction mode, and the size of the transformation unit for image data of the current maximum coding unit.

In other words, data units containing the encoding information including the same split information may be gathered by observing the encoding information assigned for the predetermined data unit from among the coding unit, the prediction unit, and the minimum unit, and the gathered data units may be considered to be one data unit to be decoded by the image data decoder 230 in the same encoding mode.

The video decoding apparatus 200 according to an exemplary embodiment may obtain information about a coding unit that generates the smallest encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored according to a size of a coding unit and an encoding mode, which are adaptively determined according to characteristics of an image, by using information about an optimum encoding mode received from an encoder.

Figure 3:
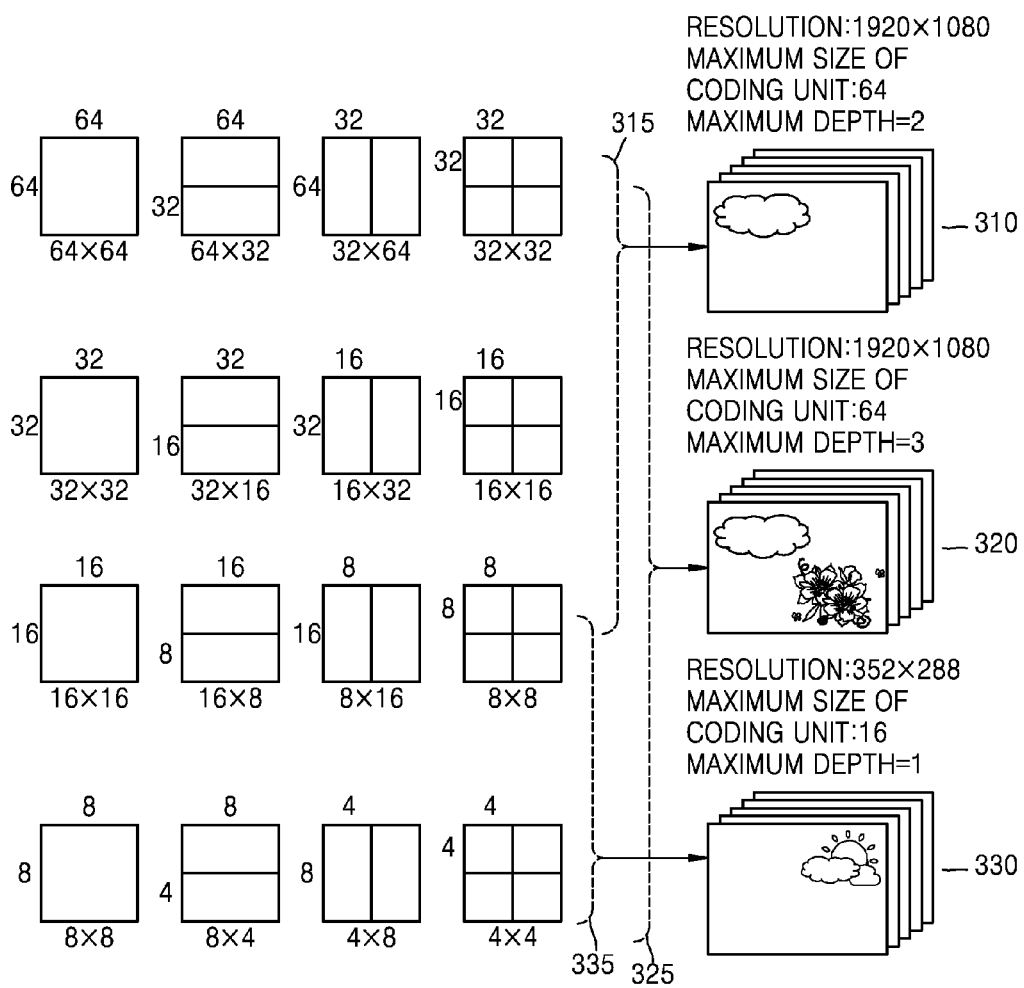
FIG. 3 is a diagram for describing a concept of coding units according to an exemplary embodiment.

FIG. 3 is a diagram for describing a concept of hierarchical coding units according to an exemplary embodiment.

A size of a coding unit may be expressed in width×height, and examples of the size of the coding unit may include 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is set to 1920×1080, a maximum size of a coding unit is set to 64, and a maximum depth is set to 2. In video data 320, a resolution is set to 1920×1080, a maximum size of a coding unit is set to 64, and a maximum depth is set to 3. In video data 330, a resolution is set to 352×288, a maximum size of a coding unit is set to 16, and a maximum depth is set to 1. The maximum depth shown in FIG. 3 denotes a total number of splits from a maximum coding unit to a minimum coding unit.

If a resolution is high or a data amount is large, a maximum size of a coding unit may be large to not only increase encoding efficiency but also to accurately reflect characteristics of an image. Accordingly, the maximum size of the coding unit of the video data 310 and 320 having the higher resolution than the video data 330 may be 64.

Because the maximum depth of the video data 310 is 2, coding units 315 of the video data 310 may include a maximum coding unit having a long axis size of 64, and coding units having long axis sizes of 32 and 16 because depths are increased to two layers by splitting the maximum coding unit twice. Meanwhile, because the maximum depth of the video data 330 is 1, coding units 335 of the video data 330 may include a maximum coding unit having a long axis size of 16, and coding units having a long axis size of 8 because depths are increased to one layer by splitting the maximum coding unit once.

Because the maximum depth of the video data 320 is 3, coding units 325 of the video data 320 may include a maximum coding unit having a long axis size of 64, and coding units having long axis sizes of 32, 16, and 8 because the depths are increased to 3 layers by splitting the maximum coding unit three times. As a depth increases, detailed information may be more precisely expressed.

Figure 4:
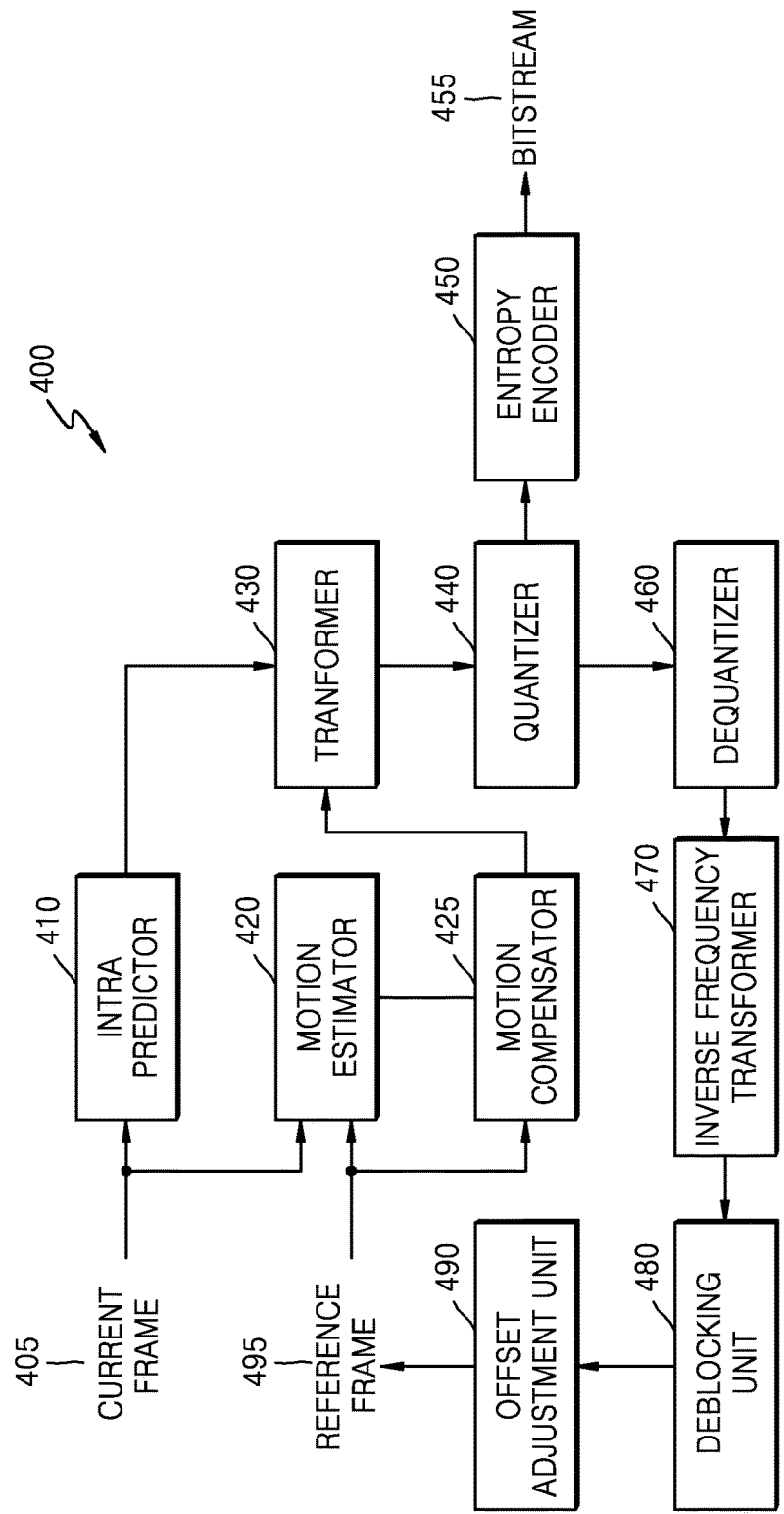
FIG. 4 is a block diagram of an image encoder based on coding units, according to an exemplary embodiment.

FIG. 4 is a block diagram of an image encoder 400 based on coding units, according to an exemplary embodiment.

The image encoder 400 according to an exemplary embodiment performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as a quantized transformation coefficient through a frequency transformer 430 and a quantizer 440. The quantized transformation coefficient is restored as data in a spatial domain through an inverse quantizer 460 and an inverse frequency transformer 470, and the restored data in the spatial domain is output as the reference frame 495 after being post-processed through a deblocking unit 480 and an offset adjustment unit 490. The quantized transformation coefficient may be output as a bitstream 455 through an entropy encoder 450.

In order for the image encoder 400 to be applied in the video encoding apparatus 100 according to an exemplary embodiment, all elements of the image encoder 400, i.e., the intra predictor 410, the motion estimator 420, the motion compensator 425, the frequency transformer 430, the quantizer 440, the entropy encoder 450, the inverse quantizer 460, the inverse frequency transformer 470, the deblocking unit 480, and the offset adjustment unit 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having the tree structure while considering the maximum size and the maximum depth of a current maximum coding unit, and the frequency transformer 430 determines the size of the transformation unit in each coding unit from among the coding units having the tree structure.

Figure 5:
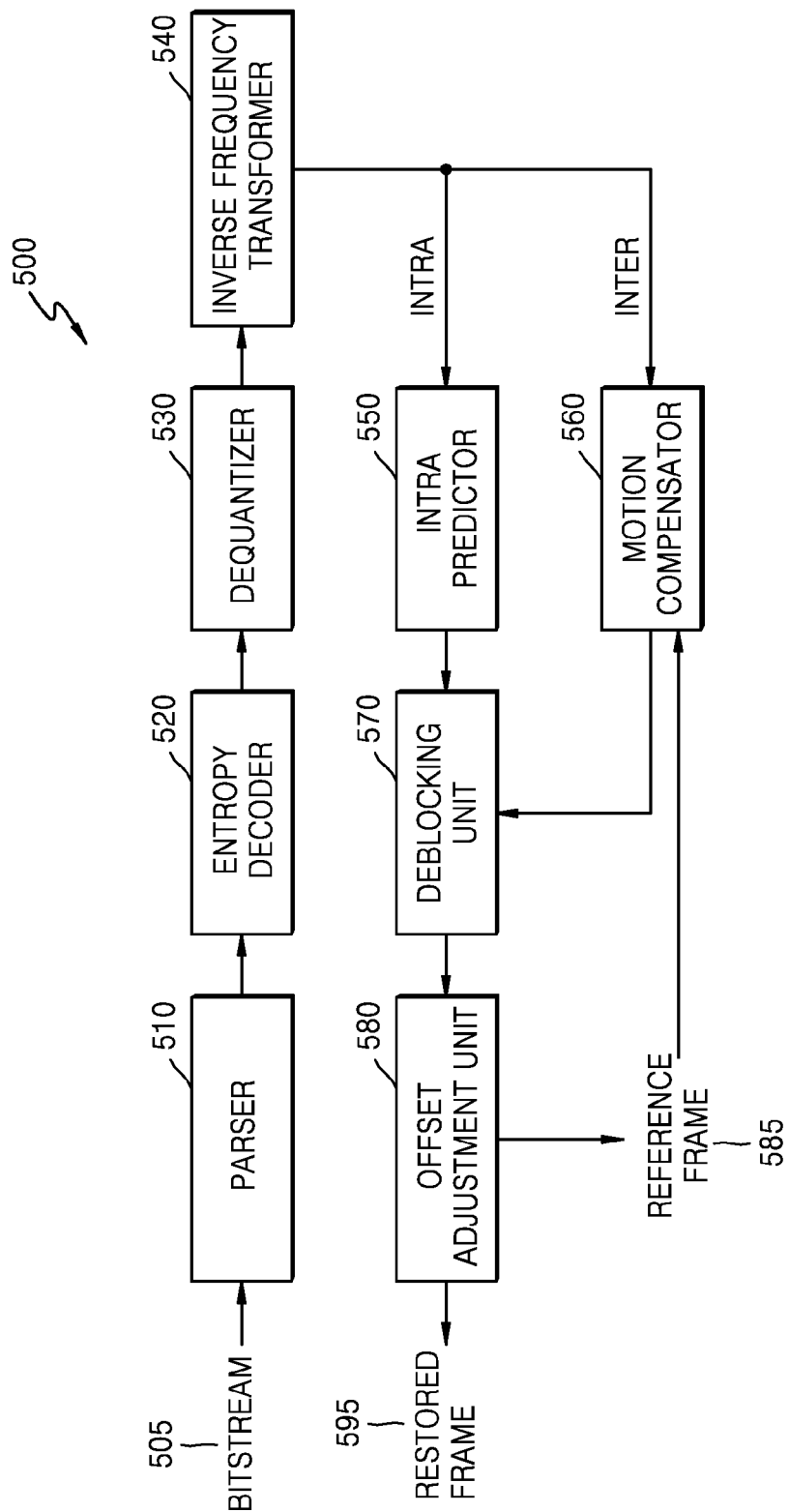
FIG. 5 is a block diagram of an image decoder based on coding units, according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse frequency transformer 540.

An intra predictor 550 performs intra prediction on coding units in an intra mode with respect to the image data in the spatial domain, and a motion compensator 560 performs motion compensation on coding units in an inter mode by using a reference frame 585.

The data in the spatial domain, which passed through the intra predictor 550 and the motion compensator 560, may be output as a restored frame 595 after being post-processed through a deblocking unit 570 and an offset adjustment unit 580. Also, the data, which is post-processed through the deblocking unit 570 and the offset adjustment unit 580, may be output as the reference frame 585.

In order to decode the image data in the image data decoder 230 of the video decoding apparatus 200, the image decoder 500 may perform operations that are performed after operations of the parser 510 are performed.

In order for the image decoder 500 to be applied in the video decoding apparatus 200 according to an exemplary embodiment, all elements of the image decoder 500, i.e., the parser 510, the entropy decoder 520, the inverse quantizer 530, the inverse frequency transformer 540, the intra predictor 550, the motion compensator 560, the deblocking unit 570, and the offset adjustment unit 580 perform operations based on coding units having a tree structure for each maximum coding unit.

Specifically, the intra predictor 550 and the motion compensator 560 determine partitions and a prediction mode for each of the coding units having the tree structure, and the inverse frequency transformer 540 determines a size of a transformation unit for each coding unit.

Figure 6:
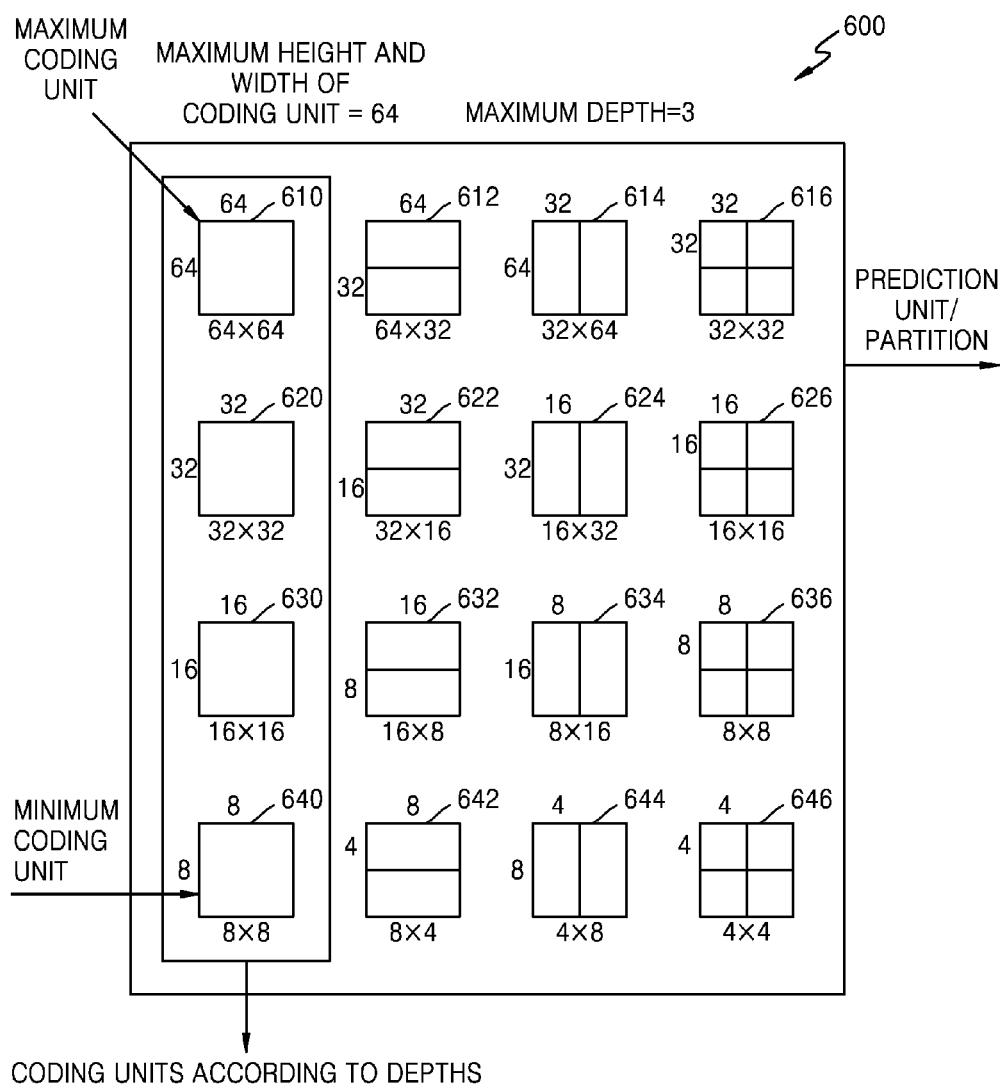
FIG. 6 is a diagram illustrating deeper coding units according to depths and prediction units, according to an exemplary embodiment.

FIG. 6 is a diagram illustrating deeper coding units according to depths and partitions, according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the maximum size of the coding unit which is previously set.

In a hierarchical structure 600 of coding units according to an exemplary embodiment, the maximum height and the maximum width of the coding units are each 64, and the maximum depth is 4. Because a depth increases along a vertical axis of the hierarchical structure 600 of the coding units according to an exemplary embodiment, a height and a width of the deeper coding unit are each split. Also, a prediction unit and partitions, which are bases for prediction encoding of each deeper coding unit, are shown along a horizontal axis of the hierarchical structure 600 of the coding units.

In other words, a coding unit 610 is a maximum coding unit in the hierarchical structure 600 of the coding units, in which a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

Finally, the coding unit 640 having the size of 8×8 and the depth of 3 is the minimum coding unit and a coding unit of a lowermost depth.

In order to determine a coded depth of the maximum coding unit 610, the coding unit determiner 120 of the video encoding apparatus 100 according to an exemplary embodiment performs encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding according to each depth, a representative encoding error that is a smallest encoding error in the corresponding depth may be selected by performing encoding for each prediction unit in the deeper coding units, along the horizontal axis of the hierarchical structure 600 of the coding units. Alternatively, the smallest encoding error may be searched for by comparing representative encoding errors according to depths by performing encoding for each depth as the depth increases along the vertical axis of the hierarchical structure 600 of the coding units. A depth and a partition having the smallest encoding error in the maximum coding unit 610 may be selected as the coded depth and a partition type of the maximum coding unit 610.

Figure 7:
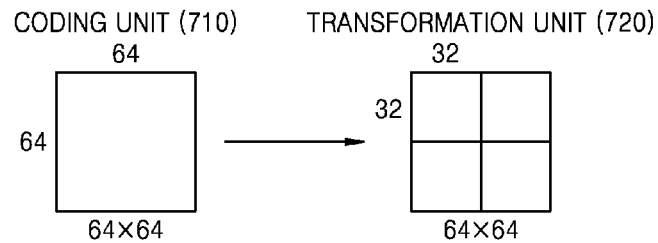
FIG. 7 is a diagram for describing a relationship between a coding unit and transformation units, according to an exemplary embodiment.

FIG. 7 is a diagram for describing a relationship between a coding unit 710 and transformation units 720, according to an exemplary embodiment.

The video encoding apparatus 100 according to an exemplary embodiment or the video decoding apparatus 200 according to an exemplary embodiment encodes or decodes an image according to coding units having sizes smaller than or equal to a maximum coding unit for each maximum coding unit. Sizes of transformation units for frequency transformation during encoding may be selected based on data units that are not larger than a corresponding coding unit.

For example, in the video encoding apparatus 100 according to an exemplary embodiment or the video decoding apparatus 200 according to an exemplary embodiment, if a size of the current coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having a smallest error may be selected.

Figure 8:
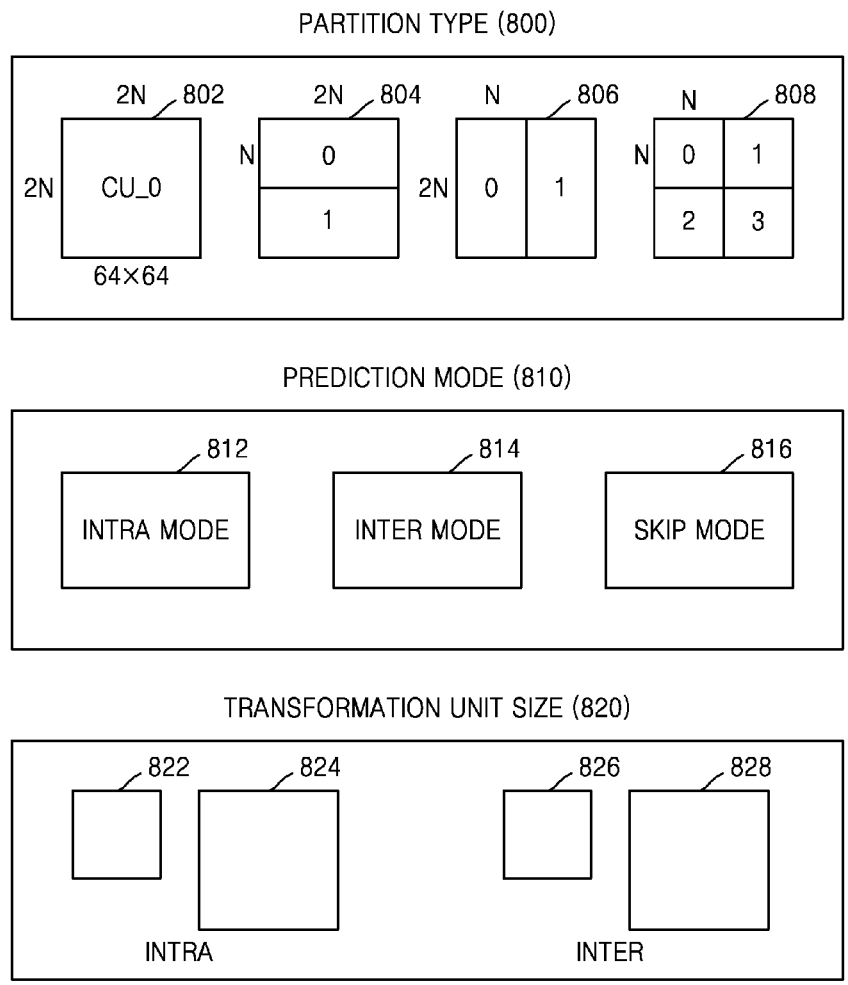
FIG. 8 is a diagram for describing encoding information of coding units corresponding to a coded depth, according to an exemplary embodiment.

FIG. 8 is a diagram for describing encoding information of coding units corresponding to a coded depth, according to an exemplary embodiment.

The output unit 130 of the video encoding apparatus 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 about the partition type indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type of the current coding unit is set to indicate one of the partition 804 having a size of 2N×N, the partition 806 having a size of N×2N, and the partition 808 having a size of N×N The information 810 about the prediction mode indicates a prediction mode of each partition. For example, the information 810 about the prediction mode may indicate a mode of prediction encoding performed on a partition indicated by the information 800, i.e., an intra mode 812, an inter mode 814, or a skip mode 816.

Also, the information 820 about the size of the transformation unit indicates a transformation unit to be based on when frequency transformation is performed on a current coding unit. For example, the transformation unit may be a first intra transformation unit 822, a second intra transformation unit 824, a first inter transformation unit 826, or a second inter transformation unit 828.

Figure 9:
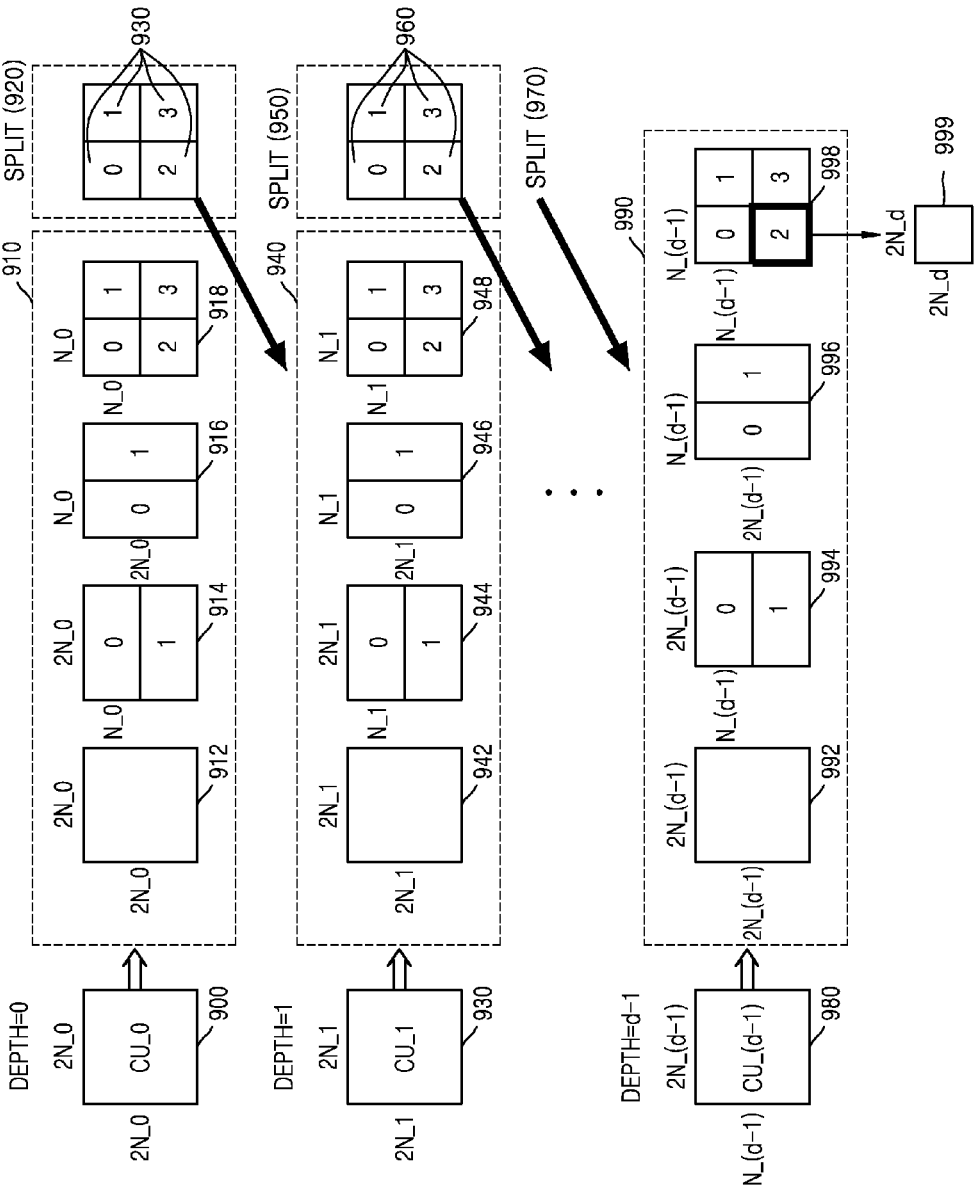
FIG. 9 is a diagram of deeper coding units according to depths according to an exemplary embodiment.

The image data and encoding information extractor 220 of the video decoding apparatus 200 according to an exemplary embodiment may extract and use the information 800 about the partition type, the information 810 about the prediction mode, and the information 820 about the size of the transformation unit for decoding according to each deeper coding unit FIG. 9 is a diagram of deeper coding units according to depths according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding has to be repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may be no longer split to a lower depth.

If the encoding error is the smallest in the partition type 918 having the size of N_0×N_0, a depth may be changed from 0 to 1 to split the partition type 918 in operation 920, and encoding may be repeatedly performed on coding units 930 having a depth of 2 and a size of N_0×N_0 to search for a smallest encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth may be changed from 1 to 2 to split the partition type 948 in operation 950, and encoding may be repeatedly performed on coding units 960, which have a depth of 2 and a size of N_2×N_2 to search for a smallest encoding error.

When a maximum depth is d, split information according to each depth may be set until a depth becomes d−1, and split information may be set until a depth becomes d−2. In other words, when encoding is performed until the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a smallest encoding error.

Even when the partition type 998 having the size of N_(d−1)×N_(d−1) has the smallest encoding error, because a maximum depth is d, a coding unit CU_(d−1) having a depth of d−1 may be no longer split to a lower depth, a coded depth for a current maximum coding unit 900 may be determined to be d−1, and a partition type of the current maximum coding unit 900 may be determined to be N_(d−1)×N_(d−1). Also, because the maximum depth is d, split information for a coding unit 952 having a depth of d−1 is not set.

A data unit 999 may be referred to as a 'minimum unit' for the current maximum coding unit. A minimum unit according to an embodiment may be a rectangular data unit obtained by splitting a minimum coding unit having a lowermost coded depth by 4. By performing the encoding repeatedly, the video encoding apparatus 100 may select a depth having a smallest encoding error by comparing encoding errors according to depths of the coding unit 900 to determine a coded depth, and may set a corresponding partition type and a prediction mode as an encoding mode of the coded depth.

As such, the encoding errors according to depths are compared in all of the depths of 1 through d, and a depth having the smallest encoding error may be determined as a coded depth. The coded depth, the partition type of the prediction unit, and the prediction mode may be encoded and transmitted as information about an encoding mode. Also, because a coding unit is split from a depth of 0 to the coded depth, only split information of the coded depth has to be set to 0, and split information of depths excluding the coded depth is set to 1.

The image data and encoding information extractor 220 of the video decoding apparatus 200 according to an exemplary embodiment may extract and use the information about the coded depth and the prediction unit of the coding unit 900 to decode the coding unit 912. The video decoding apparatus 200 according to an exemplary embodiment may determine a depth, in which split information is 0, as a coded depth by using split information according to depths, and may use information about an encoding mode of the corresponding depth for decoding.

Figure 10:
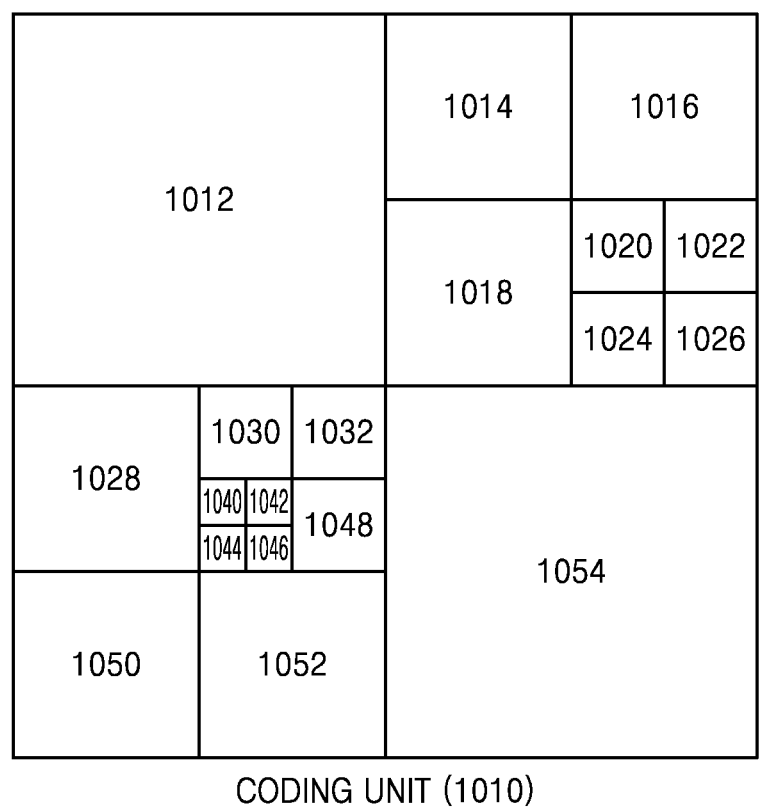
FIGS. 10 through 12 are diagrams for describing a relationship between coding units, prediction units, and frequency transformation units, according to an exemplary embodiment.
Figure 11:
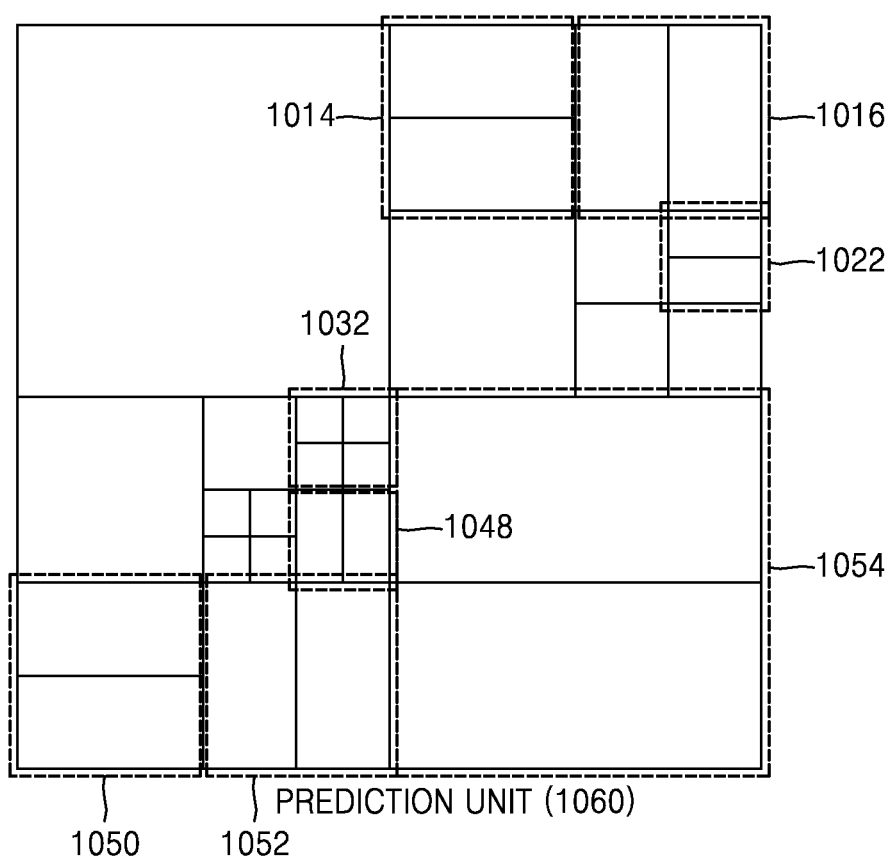
Figure 12:
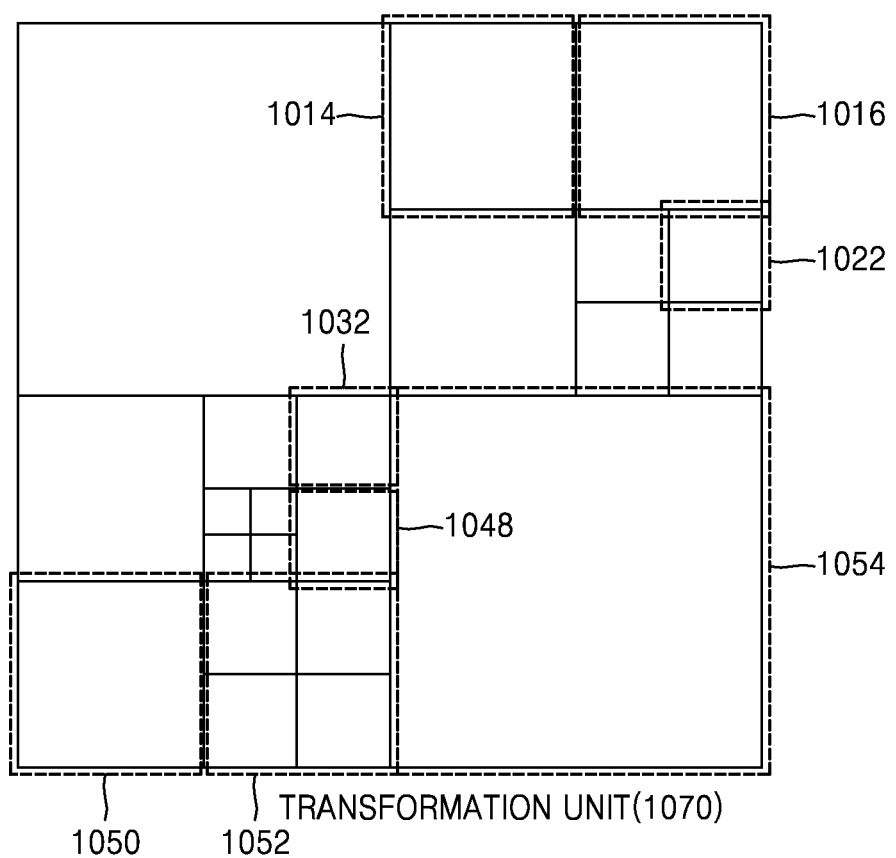

FIGS. 10 through 12 are diagrams for describing a relationship between coding units 1010, prediction units 1060, and frequency transformation units 1070, according to an exemplary embodiment.

The coding units 1010 are coding units corresponding to coded depths determined by the video encoding apparatus 100 according to an exemplary embodiment, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some partitions 1014, 1016, 1022, 1032, 1048, 1050, 1052, and 1054 are obtained by splitting the coding units. In other words, partition types in the partitions 1014, 1022, 1050, and 1054 have a size of 2N×N, partition types in the partitions 1016, 1048, and 1052 have a size of N×2N, and a partition type of the partition 1032 has a size of N×N. Prediction units and partitions of the coding units 1010 are smaller than or equal to each coding unit.

Frequency transformation or inverse frequency transformation is performed on image data of the transformation unit 1052 in the transformation units 1070 in a data unit that is smaller than a size of the transformation unit 1052. Also, the transformation units 1014, 1016, 1022, 1032, 1048, 1050, and 1052 in the transformation units 1070 are different from those in the prediction units 1060 in terms of sizes or shapes. In other words, the video encoding apparatus 100 according to an exemplary embodiment and the video decoding apparatus 200 according to an exemplary embodiment may separately perform intra prediction/motion estimation/motion compensation, and frequency transformation/inverse frequency transformation on a data unit even in the same coding unit.

Accordingly, encoding may be recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding apparatus 100 according to an exemplary embodiment and the video decoding apparatus 200 according to an exemplary embodiment.

according to the split information, encoding is independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD are respectively obtained by splitting the height of the prediction unit in 1:3 and 3:1, and the asymmetrical partition types having the sizes of nL×2N and nR×2N are respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit is set to 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be set to N×N, and if the partition type of the current coding unit is an asymmetrical partition type, the size of the transformation unit may be set to N/2×N/2.

TABLE 1

Split Information 0
(Encoding on Coding Unit having Size of 2N×2N and Current Depth of d)

| | Partition Type | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N×2N) | 2N×2N 2N×N N×2N N×N | 2N×nU 2N×nD nL×2N nR×2N | 2N×2N | N×N (Symmetrical Type) N/2×N/2 (Asymmetrical Type) | Repeatedly Encode Coding Units having Lower Depth of d + 1 |

The output unit 130 of the video encoding apparatus 100 according to an exemplary embodiment may output the encoding information about the coding units having the tree structure, and the image data and encoding information extractor 220 of the video decoding apparatus 200 according to an exemplary embodiment may extract the encoding information about the coding units having the tree structure from a received bitstream.

Split information indicates whether a current coding unit is split into coding units of a lower depth. If split information of a current depth d is 0, a depth, in which a current coding unit is no longer split to a lower depth, is a coded depth, and thus information about a partition type, a prediction mode, and a size of a transformation unit may be defined for the coded depth. If the current coding unit is further split The encoding information about coding units having a tree structure, according to an exemplary embodiment, may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth may be determined by using encoding information of a data unit, and thus a distribution of coded depths in a maximum coding unit may be determined.

Accordingly, if a current coding unit is predicted by referring to adjacent data units, encoding information of data units in deeper coding units adjacent to the current coding unit may be directly referred to and used.

Alternatively, if a current coding unit is prediction encoded by referring to adjacent data units, data units adjacent to the current coding unit in deeper coding units may be searched for by using encoded information of the data units, and the searched adjacent coding units may be referred to for prediction encoding the current coding unit.

Figure 13:
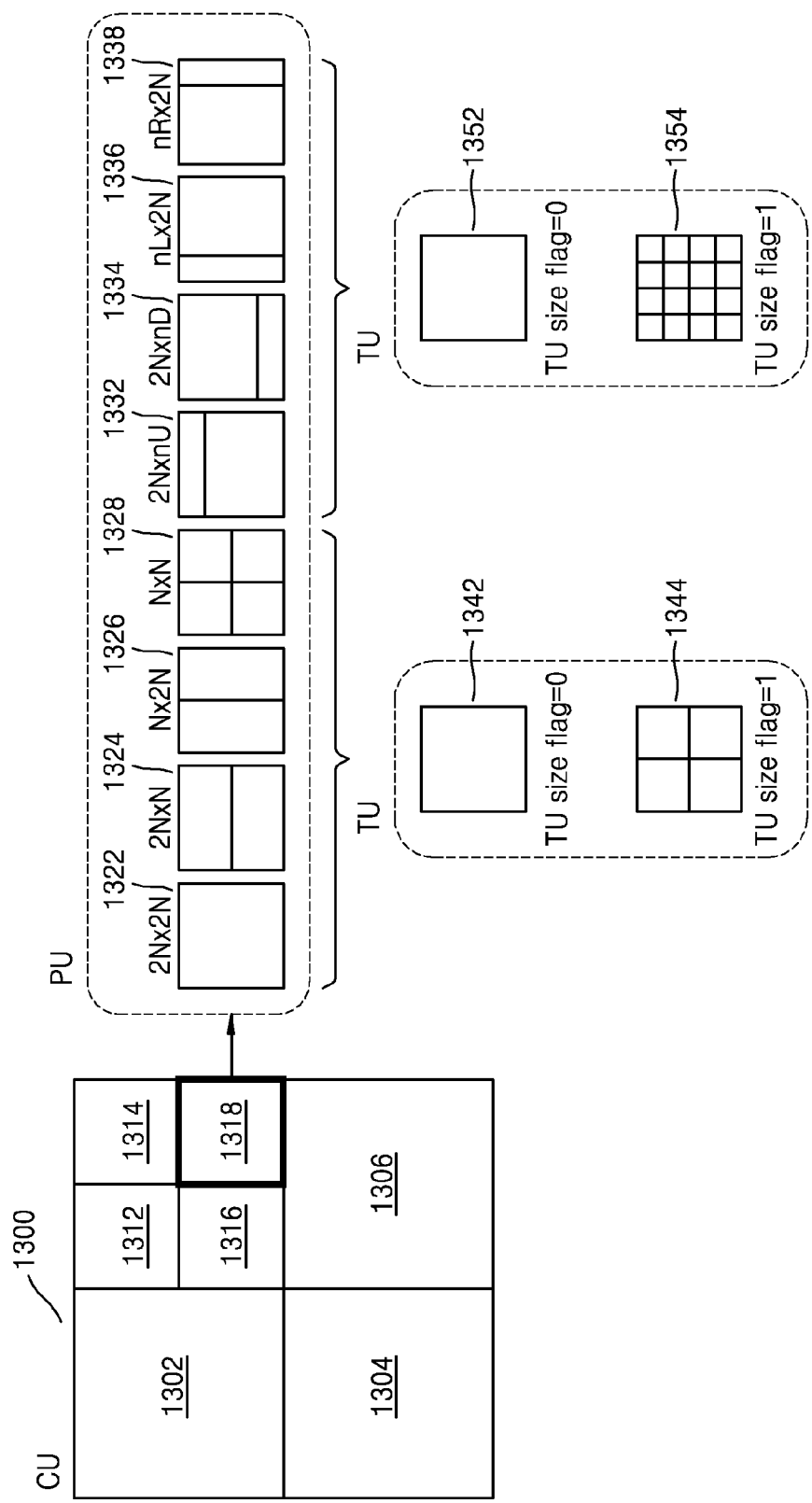
FIG. 13 is a diagram for describing a relationship between a coding unit, a prediction unit, and a transformation unit, according to encoding mode information.

FIG. 13 is a diagram for describing a relationship between a coding unit, a prediction unit, and a transformation unit, according to the encoding mode information. In FIG. 13, the encoding mode information is the encoding mode information of Table 1.

A maximum coding unit 1300 includes coding units 1302, 1304, 1306, 1312, 1314, 1316, and 1318 of coded depths. Here, because the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU (Transformation Unit)size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. A result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, then the size of a transformation unit (a-1) may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, then the size of the transformation unit (b-1) may be 32×32 when the TU size flag is 0. Here, the TU size flag cannot be set to a value other than 0, because the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and is not limited thereto.

The maximum coding unit including the coding units having the tree structure described with reference to FIGS. 1 through 13 above is variously named as a coding block tree, a block tree, a root block tree, a coding tree, a coding root, or a tree trunk.

The multi-view video encoding method and the multi-view video decoding method based on coding units having the tree structure according to exemplary embodiments will be described with reference to FIGS. 14 through 31 below.

Figure 14:
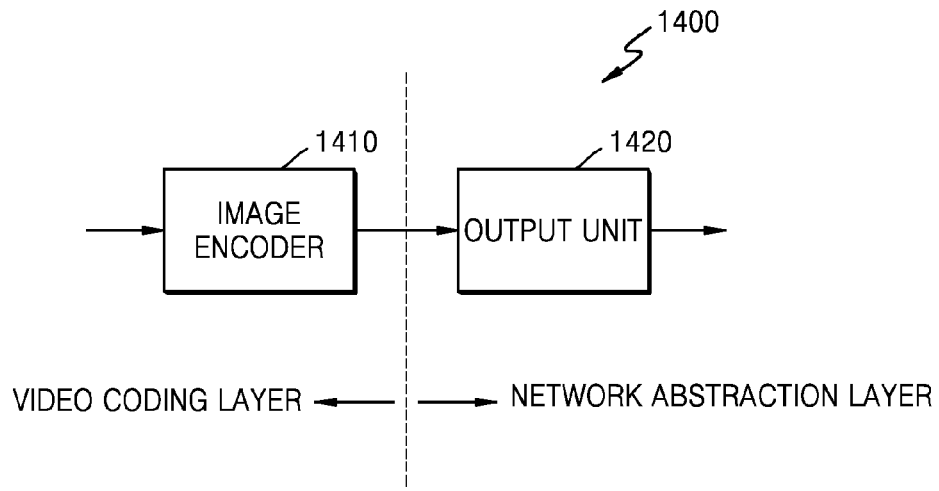
FIG. 14 is a block diagram of a multi-view video encoding apparatus according to an exemplary embodiment.

FIG. 14 is a block diagram of a multi-view video encoding apparatus 1400 according to an exemplary embodiment.

Referring to FIG. 14, the multi-view video encoding apparatus 1400 according to an exemplary embodiment includes an image encoder 1410 and an output unit 1420. The multi-view video encoding apparatus 1400 may receive and encode an image sequence such as a two-dimensional (2D) video, a three-dimensional (3D) video, and a multi-view video.

The image encoder 1410 corresponds to a video coding layer. The output unit 1420 corresponds to a network abstraction layer (NAL) that adds and outputs encoded video data and additional information to transmission unit data of a predetermined format. According to an exemplary embodiment, the transmission unit data may be an NAL unit.

To allow various terminals to provide an optimal service in various network environments, the multi-view video encoding apparatus 1400 scalably generates and outputs a bitstream including various spatial resolutions, qualities, various frame rates, and a multi-view image in such a way that the bitstream may be reconstructed in accordance with the capability of each of various terminals. That is, the image encoder 1410 may encode an input image according to various scalable extension types (SETs) generate and output a scalable video bitstream. The scalable extension types include temporal, spatial, quality, and multi-view scalabilities.

Scalability is a case in which a video stream splits into valid substreams in accordance with a capability of a reception terminal. For example, a spatially scalable bitstream includes a substream having a lower resolution than an original resolution, and a temporally scalable bitstream includes a substream having a lower frame rate than an original frame rate. A quality scalable bitstream includes a substream having the same spatio-temporal resolution as an entire bitstream and having a smaller fidelity or signal-to-noise ratio (SNR) than the entire bitstream. A multi-view scalable bitstream includes substreams having different views within a single bitstream. As an example, a stereo scopic image includes a left image and a right image.

Different scalable extension types may be combined with each other. In this case, a single scalable video bitstream may include an encoded image having different spatio-temporal resolutions, quality, and different views.

The output unit 1420 adds and outputs an scalable extension type of the encoded image to the bitstream.

Figure 15:
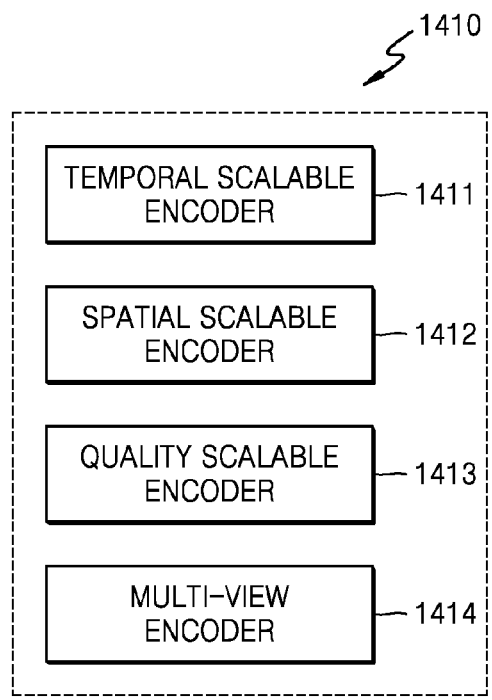
FIG. 15 is a block diagram of an image encoder according to an exemplary embodiment.
Figure 16:
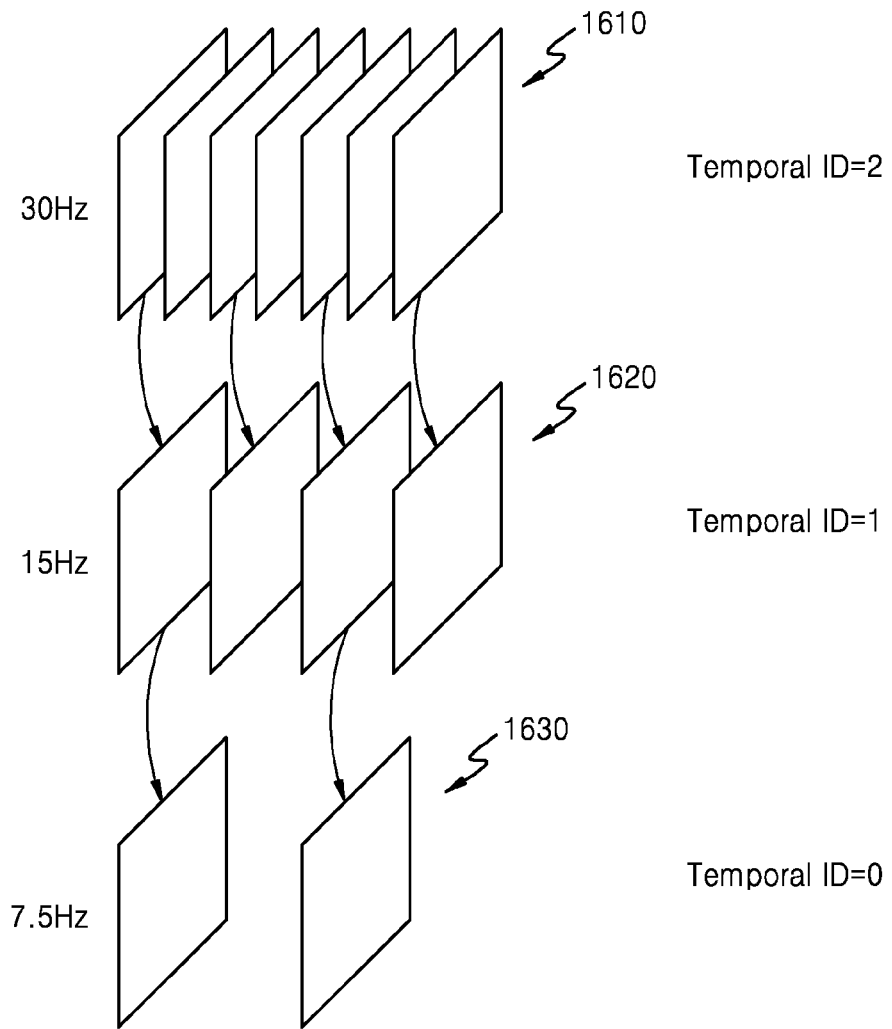
FIG. 16 illustrates an example of a temporal scalable image.
Figure 17:
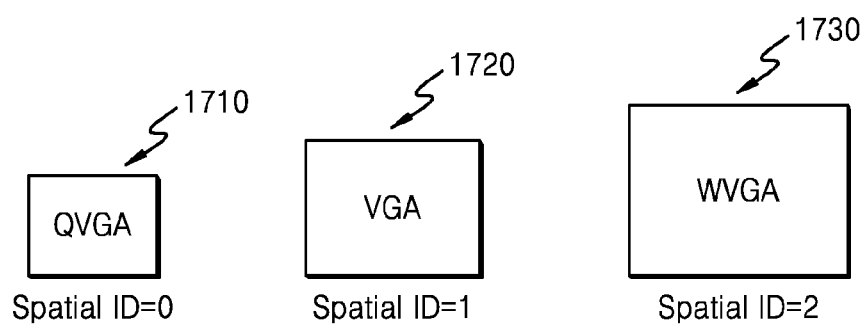
FIG. 17 illustrates an example of a spatial scalable image.
Figure 18:
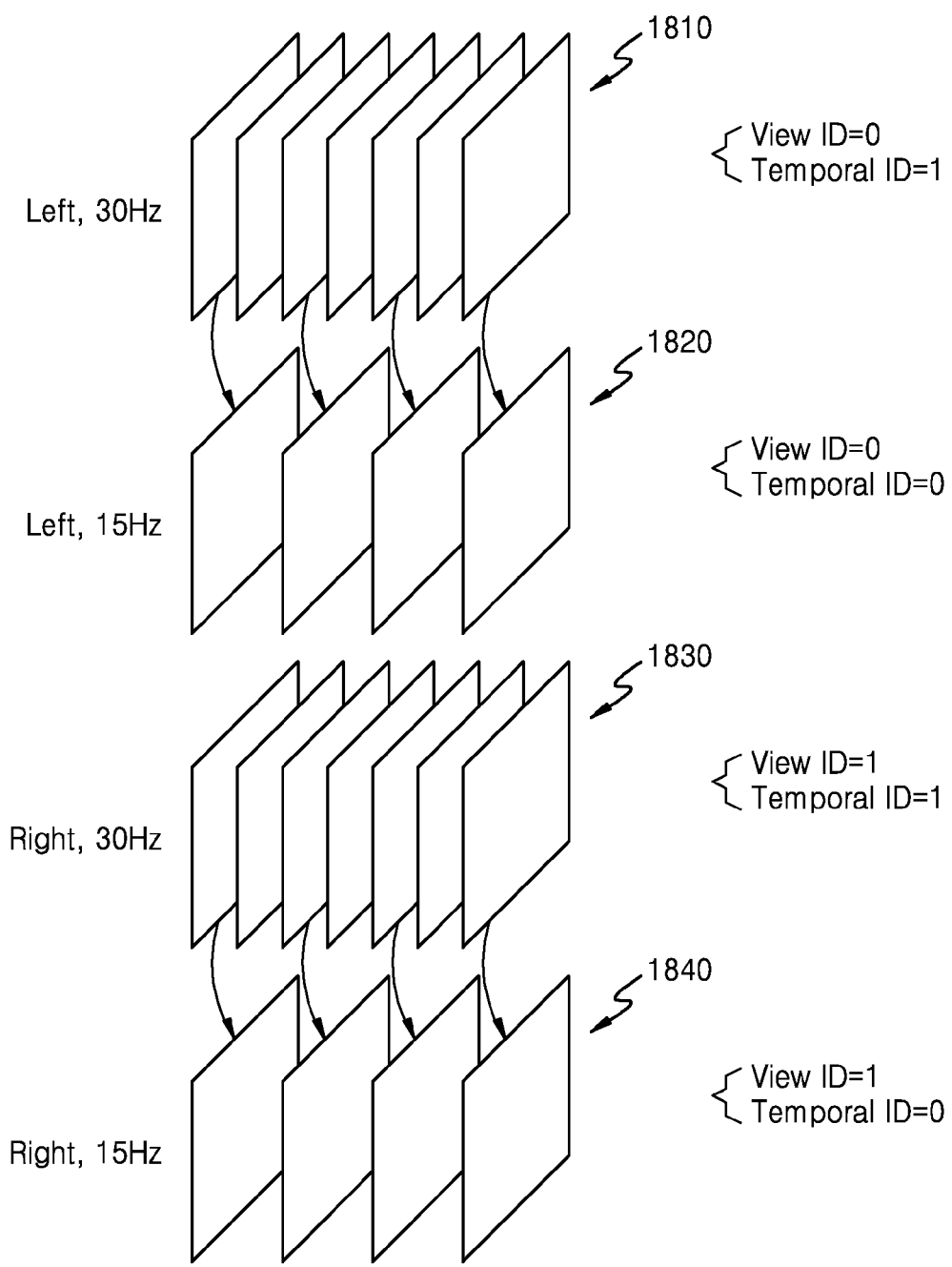
FIG. 18 illustrates an example of a temporal and spatial scalable image.

FIG. 15 is a block diagram of the image encoder 1410 of FIG. 14 according to an exemplary embodiment.

Referring to FIG. 15, the image encoder 1410 includes a temporal scalable encoder 1411, a spatial scalable encoder 1412, a quality scalable encoder 1413, and a multi-view encoder 1414.

The temporal scalable encoder 1411 temporally and scalably encodes an input to generate and output a temporally scalable bitstream. The temporally scalable bitstream includes substreams having different frame rates in a single bitstream. For example, referring to FIG. 16, the temporal scalable encoder 1411 may encode images of a first temporal layer 1630 having a frame rate of 7.5 Hz to generate a bitstream of a first temporal layer that is a basic layer. In this case, the output unit 1420 may add temporal ID=0 to the bitstream generated by encoding the images of the first temporal layer 1630 as a temporally SET indicating the images belonging to the first temporal layer 1630. Similarly, the temporal scalable encoder 1411 may encode images of a second temporal layer 1620 having a frame rate of 15 Hz to generate a bitstream of a second temporal layer that is an enhancement layer. In this case, the output unit 1420 may add temporal ID=1 to the bitstream generated by encoding the images of the second temporal layer 1620 as a temporally SET indicating the images belonging to the second temporal layer 1620. Similarly, the temporal scalable encoder 1411 may encode images of a third temporal layer 1610 having a frame rate of 30 Hz to generate a bitstream of a third temporal layer that is the enhancement layer. In this case, the output unit 1420 may add temporal ID=2 to the bitstream generated by encoding the images of the third temporal layer 1610 as a temporally SET indicating the images belonging to the third temporal layer 1610. The temporal scalable encoder 1411 may perform encoding by using correlations between the first through third temporal layers 1610, 1620, and 1630 when encoding the images included in the first through third temporal layers 1610, 1620, and 1630. The temporal scalable encoder 1411 may generate the temporally scalable bitstream by using motion compensated temporal filtering or hierarchical B-pictures.

The spatial scalable encoder 1412 spatially and scalably encodes the input image to generate and output a spatially scalable bitstream. The spatially scalable bitstream includes substreams having different frame rates in a single bitstream. For example, referring to FIG. 17, the spatial scalable encoder 1412 may encode images of a first spatial layer 1710 having a QVGA resolution to generate a bitstream of a first spatial layer that is the basic layer. In this case, the output unit 1420 may add spatial ID=0 to the bitstream generated by encoding the images of the first spatial layer 1710 as a spatially SET indicating the images belonging to the first spatial layer 1710. Similarly, the spatial scalable encoder 1412 may encode images of a second spatial layer 1720 having a VGA resolution to generate a bitstream of a second spatial layer that is the enhancement layer. In this case, the output unit 1420 may add spatial ID=1 to the bitstream generated by encoding the images of the second spatial layer 1720 as a spatially SET indicating the images belonging to the second spatial layer 1720. Similarly, the spatial scalable encoder 1412 may encode images of a third spatial layer 1730 having a WVGA resolution to generate a bitstream of a third spatial layer that is the enhancement layer. In this case, the output unit 1420 may add spatial ID=2 to the bitstream generated by encoding the images of the third spatial layer 1730 as a spatially SET indicating the images belonging to the third spatial layer 1730. The spatial scalable encoder 1412 may perform encoding by using correlations between the first through third spatial layers 1710, 1720, and 1730 when encoding the images included in the first through third spatial layers 1710, 1720, and 1730.

The quality scalable scalably encoder 1413 encodes the input image quality to generate and output a quality scalable bitstream. The quality scalable encoder 1413 may scalably encode the input image quality by using coarse-grained scalability (CGS), medium-grained scalability (MGS), and fine-grained scalability (FGS). The quality scalable encoder 1413 may establish Quality ID=0 as a quality SET for identifying a bitstream of a first quality layer by using the CGS, Quality ID=1 as a quality SET for identifying a bitstream of a second quality layer by using the MGS, and Quality ID=2 as a quality SET for identifying a bitstream of a third quality layer by using the GGS. The output unit 1420 adds and outputs the quality SET established in the bitstream.

The multi-view encoder 1414 encodes and outputs a multi-view image and a depth map image and establishes an SET indicating whether the encoded image is related to a basic view image or an additional view image, a depth flag indicating whether the encoded image is a texture image or the depth map image, and a view ID of the encoded image. For example, when the SET has 2 bits, "01" indicates the additional view image, "11" indicates the basic view image, if the depth flag is 0, the encoded image is the texture image, and, if the depth flag is 1, the encoded image is the depth map image, the multi-view encoder 1414 establishes the SET having "01" or "10" according to whether the encoded image is related to the basic view image or the additional view image, and establishes the depth flag according to whether the encoded image is the texture image or the depth map image. The multi-view encoder 1414 establishes the view ID according to a view that belongs to the encoded image. As will be described later, because a view may be determined with respect to the basic view image based on the SET, a temporal ID of the basic view image may be additionally established instead of the view ID. The temporal ID established with respect to the basic view image may be used as a temporal ID of another additional view image transmitted by a same access unit. The output unit 1420 adds and outputs the established SET, depth flag, and view ID to the bitstream.

As described above, different SETs may be combined with each other. Thus, the image encoder 1410 may classify an input image sequence into layer images having different spatio-temporal resolutions, quality, and different views and encode the layer images according to classified layers to generate bitstreams having different spatio-temporal resolutions, quality, and different views. For example, referring to FIG. 18, when the image encoder 1410 encodes an image frame including image sequences 1810 having a left view and a temporal resolution of 30 Hz to generate a bitstream, View ID=0 and, Temporal ID=1 may be established as information indicating SETs applied to the image sequences 1810. When the image encoder 1410 encodes an image frame including image sequences 1820 having the left view and a temporal resolution of 15 Hz to generate a bitstream, View ID=0 and, Temporal ID=0 may be established as information indicating SETs applied to the image sequences 1820. When the image encoder 1410 encodes an image frame including image sequences 1830 having a right view and the temporal resolution of 30 Hz to generate a bitstream, View ID=1 and, Temporal ID=1 may be established as information indicating SETs applied to the image sequences 1830. When the image encoder 1410 encodes an image frame including image sequences 1840 having the right view and the temporal resolution of 15 Hz to generate a bitstream, View ID=1 and, Temporal ID=0 may be established as information indicating SETs applied to the image sequences 1840.

Figure 19:
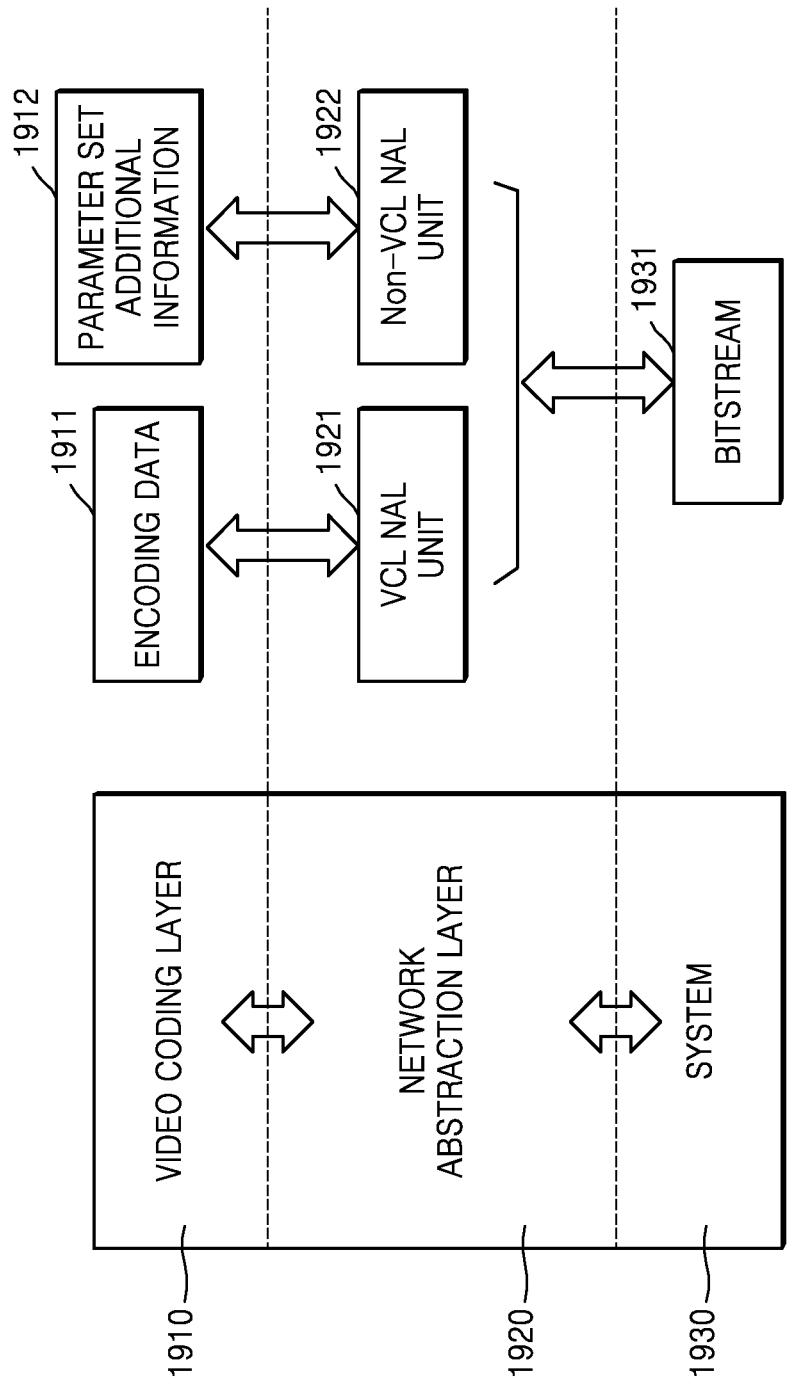
FIG. 19 is a diagram for explaining a hierarchical classification of video encoding and decoding processes according to an exemplary embodiment.

FIG. 19 is a diagram for explaining a hierarchical classification of video encoding and decoding processes according to an exemplary embodiment.

Referring to FIG. 19, the video encoding and decoding processes may include encoding and decoding processes performed in a video coding layer (VCL) 1910 that processes video encoding and encoding and decoding processes performed by an NAL 1920 that generates or receives encoded image data and additional information to a bitstream having a predetermined format between a subordinate system 1930 that transmits and stores the encoded image data and the VCL 1910. As an example, encoding data 1911 that is an output of an encoding process performed by the image encoder 1410 of the multi-view video encoding apparatus 1400 of FIG. 14 is VCL data and is mapped to a VCL NAL unit 1921 through the output unit 1420. A plurality of pieces of parameter set information 1912 relating to the encoding process, such as prediction mode information and an SET about an encoding unit used to generate the encoding data 1911 in the VCL 1910, is mapped to a non-VCL NAL unit 1922. The SET may be transmitted by being included in an NAL unit reserved for a future extension among NAL units.

FIGS. 20A and 20B illustrate examples of a header of an NAL unit according to exemplary embodiments. Other than multi-view or scalable video data, The NAL unit of FIGS. 20A and 20B is used to transmit single view video data.

Referring to FIGS. 20A and 20B, the header of the NAL unit has a total length of 2 bytes (0~7:1 byte). The header of the NAL unit includes forbidden_zero_bit (F) 2010 having "0" as a bit for identifying the NAL unit, an ID NAL unit type (NUT) 2020 indicating a type of the NAL unit, and a region reserved_zero_6bits 2030 reserved for a future use, and a temporal ID (TID) 2040. Each of the ID NUT 2020 and the reserved region 2030 includes 6 bits. The TID 2040 may include 3 bits.

To perform multi-view and scalable video extension on the NAL unit of FIGS. 20A and 20B, the output unit 1420 according to an exemplary embodiment may use the region reserved_zero_6bits 2030 reserved for a future use and the TID 2040 among regions of the header of the NAL unit.

FIG. 21 illustrates a header of an NAL unit for a scalable extension according to an exemplary embodiment.

Referring to FIG. 21, the header of the NAL unit for the scalable extension according to an exemplary embodiment includes an M-bit SET 2110 and an N-bit layer ID (LID) 2120 indicating an SET of an encoded image among combinations of a plurality of SETs included in an SET table, in addition to forbidden_zero_bit (F) having "0" as a bit for identifying the NAL unit and an ID NUT indicating a type of the NAL unit.

The NUT nal_unit_type may include an instantaneous decoding refresh (IDR) picture, a clear random access (CRA) picture, an SPS, a picture parameter set (PPS), supplemental enhancement information (SEI), an NAL unit reserved to be used for a future extension, an unspecified NAL unit according to a value thereof. Table 2 below is an example of types of NAL units according to a value of the ID NUT.

TABLE 2

| nal_unit_type | Types of NAL Units |
|---|---|
| 0 | Unspecified |
| 1 | Picture other than CRA and picture slice other than IDR |
| 2-3 | Reserved for future extension |
| 4 | Slice of CRA picture |
| 5 | Slice of IDR picture |
| 6 | SEI |
| 7 | SPS |
| 8 | PPS |
| 9 | Access Unit (AU) Delimiter |
| 10-11 | Reserved for future extension |
| 12 | Filler data |
| 13 | Reserved for future extension |
| 14 | APS |

TABLE 2-continued

| nal_unit_type | Types of NAL Units |
|---|---|
| 15-23 | Reserved for future extension |
| 24-64 | Unspecified |

According to an exemplary embodiment, a value of the NUT adds information indicating the SET to the NAL unit having one of values 2-3, 10-11, 13, 15-23, and 24-64. That is, according to an exemplary embodiment, a bitstream that is compatible with another video compression standard and provides scalability may be generated by adding the SET to the NAL unit reserved to be used for the future extension or the unspecified NAL unit. The present exemplary embodiment is not limited to the types of the NAL units of Table 2 above. An NAL unit reserved for the future extension or an unspecified NAL unit in various video compression standards may be used as a data unit for transmitting the SET.

Referring to FIG. 21 again, the header of the NAL unit includes the SET 2110 including an M (M is an integer) number of bits and the LID 2120 including an N (N is an integer) number of bits for the SET.

Figures 22, 23:
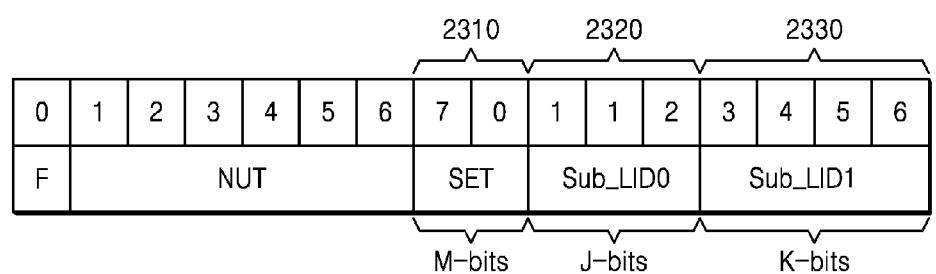
FIG. 22 is a table of scalable extension types (SETs) according to an exemplary embodiment.
FIG. 23 illustrates a header of an NAL unit for a scalable extension according to another exemplary embodiment.

FIG. 22 is a table of SETs according to an exemplary embodiment.

When the SET 2110 has a specific value k (k is an integer), the table of SETs may be specified. It is assumed that when the SET 2110 has the specific value k, the table of SETs of FIG. 22 is specified. Combinations of the SETs may be determined according to a value of the LID 2120. For example, if it is assumed that the SET 2110 has a specific value of k and the LID 2120 has a value of 6, the corresponding NAL unit is a data unit having the SET of Dependency ID=1, Quality ID=0, View ID=1, and Temporal ID=0 that is a combination 2210 of the SETs.

Although the table of the SETs is shown in FIG. 22 when the SET 2110 has the specific value k, because the SET 2110 has a value of 2×M at the maximum when the SET 2110 includes the M number of bits as shown in FIG. 21, the table of 2×M number of SETs may be specified in advance according to the value of the SET 2110. The table of the SETs of FIG. 22 may be specified in a video encoding apparatus and a video decoding apparatus in advance, and may be transferred from the video encoding apparatus to the video decoding apparatus through an SPS, a PPS, and an SEI message.

FIG. 23 illustrates a header of an NAL unit for a scalable extension according to another exemplary embodiment.

Like the header of the NAL unit described with reference to FIG. 21 above, SETs are included by specifying a region reserved to be used for a future extension and a TID region.

The output unit 1420 specifies a reserved region and a TID region of FIG. 20 again and establishes a J-bit first sub layer index Sub-LID0 2320 including J (J is an integer) number of bits and a K-bit second sub layer index Sub_LID1 2330 including K (K is an integer) number of bits.

An SET 2310 of FIG. 23 is combined scalable index information indicating which SET corresponds to each of the first sub layer index Sub-LID0 2320 and the second sub layer index Sub_LID1 2330, and is used to determine which of a plurality of SETs corresponds to each of the first sub layer index Sub-LID0 2320 and the second sub layer index Sub_LID1 2330.

Figures 24, 25, 26:
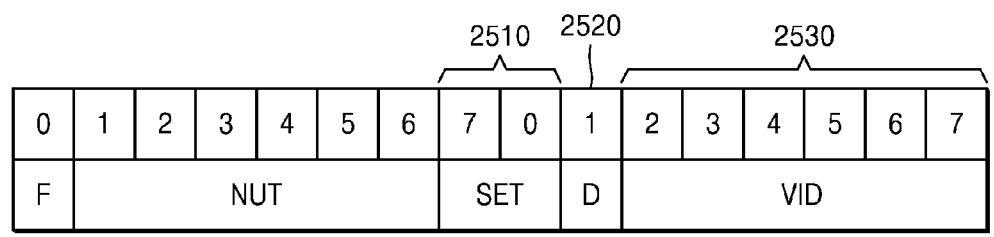
FIG. 24 is a table of SETs indicating a first sub layer index and a second sub layer index according to an SET of the header of the NAL unit of FIG. 23.
FIG. 25 illustrates a header of an NAL unit for a multi-view extension, according to an exemplary embodiment.
FIG. 26 is a table of a multi-view ID according to SETs of a header of an NAL unit for a multi-view extension, according to an exemplary embodiment.

FIG. 24 is a table of SETs indicating the first sub layer index Sub-LID0 2320 and the second sub layer index Sub_LID1 2330 according to the SET 2310 of the header of the NAL unit of FIG. 23.

Referring to FIGS. 23 and 24, the tables show SETs indicating values of the first sub layer index Sub-LID0 2320 and the second sub layer index Sub_LID1 2330 according to a value of the SET 2310. For example, when the SET 2310 has a value of 1, the value of the first sub layer index Sub-LID0 2320 indicates an SET View ID, and the value of the second sub layer index Sub-LID1 2330 indicates an SET TID. When the SET 2310 has a value of 2, the value of the first sub layer index Sub-LID0 2320 indicates an SET dependency_id, and the value of the second sub layer index Sub-LID1 2330 indicates an SET quality_id.

The table of FIG. 24 includes 2 sub layer indices relating to the first sub layer index Sub-LID0 2320 and the second sub layer index Sub-LID1 2330 of FIG. 23, but is not limited thereto. A sub layer index may extend to indicate 2 or more SETs within an available bit number range. The SETs indicating the first sub layer index Sub-LID0 2320 and the second sub layer index Sub-LID1 2330 may be changed according to the SET 2310.

A method of determining an SET, according to another exemplary embodiment, may be combined with a method of determining an SET of an image encoded by referring to a table of SETs according to an exemplary embodiment. For example, referring to FIG. 24, when the SET 2310 has a value of 0, instead of the first sub layer index Sub-LID0 2320 and the second sub layer index Sub-LID1 2330, priority_id indicating an SET of an encoded image among combinations of a plurality of SETs included in the table of SETs may be included. The table of SETs may be specified in a video encoding apparatus and a video decoding apparatus in advance, and may be transferred from the video encoding apparatus to the video decoding apparatus through an SPS, a PPS, and a SEI message.

FIG. 25 illustrates a header of an NAL unit for a multi-view extension, according to an exemplary embodiment.

Referring to FIG. 25, the output unit 1420 specifies a region reserved to be used for a future extension and a TID region again among regions of a header of an NAL unit of FIG. 20 for the multi-view extension, and includes a multi-view ID in the header of the NAL unit.

The output unit 1420 specifies the reserved region and the TID region of FIG. 20, and establishes an SET 2510 including 2 bits, a depth flag D 2520 including 1 bit, and a view ID 2530. The SET 2510 indicates which view of image is related to an image included in the NA unit among a basic view image and an additional view image. The depth flag D 2520 indicates whether the image included in the NAL unit is a texture image or a depth map image. The view ID 2530 indicates a view of the image included in the NAL unit. If n number of views from 0 to n−1 are available, the view ID 2530 is an index indicating one of the n number of views.

FIG. 26 is a table of a multi-view ID according to SETs of a header of an NAL unit for a multi-view extension, according to an exemplary embodiment.

Referring to FIG. 26, when the SET 2510 has a value of 0 or 2, it may be indicated that an NAL unit is reserved for a future extension. When the SET 2510 has a value of 1, data included in a current NAL unit is an additional view image. The NAL unit including the additional view image includes a depth flag depth_flag 2610 of a 1 bit indicating whether the current NAL unit is a texture image or a depth map image and a view ID view_id 2620 of the additional view image. When the depth flag depth_flag 2610 is 0, the image included in the current NAL unit is the texture image. When the depth flag depth_flag 2610 is 1, the image included in the current NAL unit is the depth map image. When the multi-view image includes 2 or more multi-view images, because it is necessary to indicate which view of image is the additional view image included in the current NAL unit, the view ID view_id 2620 is added.

When the value of the SET 2510 is 3, data included in the current NAL unit indicates a basic view image. As described above, the NAL unit including the additional view image may include a depth flag depth_flag 2630 of a 1 bit indicating whether the current NAL unit is the texture image or the depth map image. If the value of the SET 2510 is 3, and the data included in the current NAL unit is determined to be the basic view image, because a view of the data included in the current NAL unit may be determined as a basic view, it is unnecessary to additionally transmit the view ID view_id. Thus, the NAL unit regarding the basic view image when the value of the SET 2510 is 3 includes a TID temporal_id 2640 instead of the view ID view_id. If the TID temporal_id 2640 is transmitted by being added to the header of the NAL unit regarding the basic view image, an encoding side may establish the same TID as the TID temporal_id of the basic view image with respect to additional view images that are transmitted by being included in the same access unit as the NAL unit including the basic view image.

FIG. 27 is a table of a syntax structure of an NAL unit for a multi-view extension according to an exemplary embodiment.

Referring to FIG. 27, a header of the NAL unit for the multi-view extension, according to an exemplary embodiment, may include, in addition to forbidden_zero_bit having a value 0 as a bit for identifying the NAL unit and the ID nal_unit_type indicating a type of the NAL unit, an SET indicating which view of image is related to an image included in the NAL unit among a basic view image and an additional view image, the depth flag depth_flag indicating whether the image included in the NAL unit is a texture image or a depth map image, and a view ID view_id of the image included in the NAL unit. When the view ID view_id is not included in the header, the view of the image of the NAL unit may be determined as a basic view that is a default view of the image.

FIG. 28 is a table of a syntax structure of an NAL unit for a multi-view extension, according to another exemplary embodiment.

Referring to FIG. 28, a header of the NAL unit for the multi-view extension, according to an exemplary embodiment, may include, in addition to forbidden_zero_bit having a value 0 as a bit for identifying the NAL unit and the ID nal_unit_type indicating a type of the NAL unit, the SET indicating which view of image is related to an image included in the NAL unit among a basic view image and an additional view image. As described above, when the SET is 1, the image included in the NAL unit is the additional view image, and when the SET is 3, the image included in the NAL unit is the basic view image. If the SET is 1 and the image included in the NAL unit is the additional view image, the header of the NAL unit may include the depth flag depth_flag indicating whether the image included in the NAL unit is a texture image or a depth map image, and a view ID view_id of the image included in the NAL unit. If the SET is 1 and the image included in the NAL unit is the basic view image, the header of the NAL unit may include the TDI temporal_id of the basic view image included in the NAL unit. The NAL unit including the basic view image may additionally include the depth flag depth_flag indicating whether the image included in the NAL unit is the texture image or the depth map image.

Figure 29:
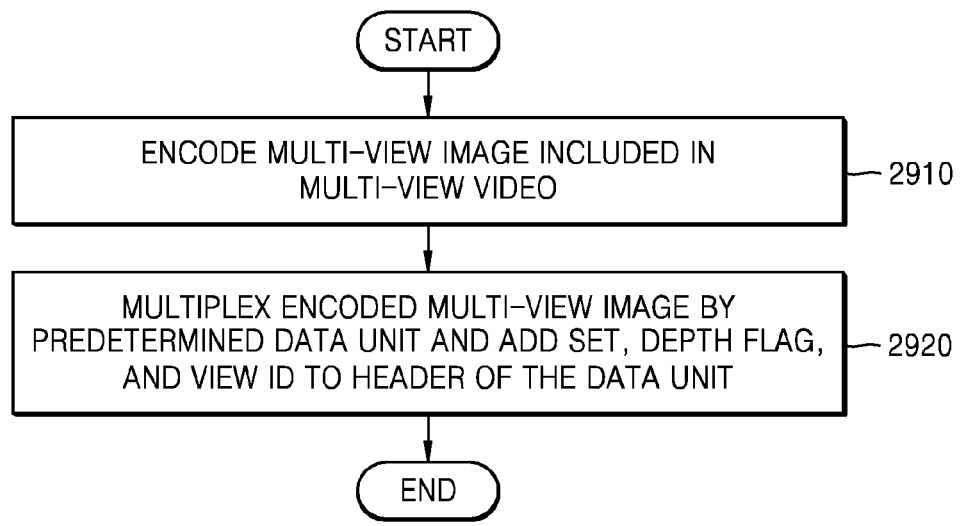
FIG. 29 is a flowchart of a multi-view video encoding method according to an exemplary embodiment.

FIG. 29 is a flowchart of a multi-view video encoding method according to an exemplary embodiment.

Referring to FIG. 29, in operation S2910, the image encoder 1410 encodes a multi-view image included in a multi-view video. The image encoder 1410 may establish an SET indicating which view of image is related to an image that is to be encoded among a basic view image and an additional view image, the depth flag depth_flag indicating whether the image that is to be encoded is a texture image or a depth map image, and a view ID of the image that is to be encoded. As described above, when the SET has 2 bits, "01" indicates the additional view image, and "11" indicates the basic view image, if the depth flag is 0, the image that is to be encoded is the texture image, and, if the depth flag is 1, and the image that is to be encoded is the depth map image, the multi-view encoder 1414 establishes the SET having "01" or "10" according to whether the image that is to be encoded is related to the basic view image or the additional view image, and establishes the depth flag according to whether the image that is to be encoded is the texture image or the depth map image. The multi-view encoder 1414 also establishes the view ID according to a view that belongs to the image that is to be encoded.

In operation S2920, the output unit 1420 adds and outputs the established SET, depth flag, and view ID to a bitstream. In more detail, the output unit 1420 multiplexes an encoded multi-view image by an NAL unit and adds the established SET, the depth flag, and the view ID to a header of the NAL unit. As described above, the output unit 1420 may include the TID temporal_id in the NAL unit including the basic view image instead of the view ID view_id. If the TID temporal_id is transmitted by being added to the header of the NAL unit of the basic view image, a decoding side may establish the TID by using the TID temporal_id of the basic view image with respect to additional view images that are transmitted by being included in the same access unit as the NAL unit including the basic view image.

Figure 30:
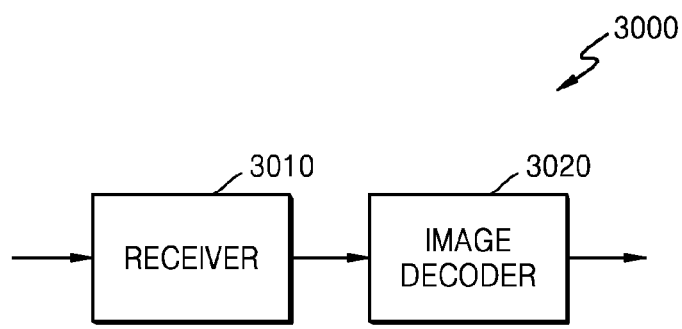
FIG. 30 is a block diagram of a multi-video decoding apparatus according to an exemplary embodiment.

FIG. 30 is a block diagram of a multi-video decoding apparatus 3000 according to an exemplary embodiment.

Referring to FIG. 30, the multi-view decoding apparatus 3000 includes a receiver 3010 and an image decoder 3020.

The receiver 3010 receives an NAL unit of an NAL and obtains the NAL unit, including an SET or multi-view extension information, according to exemplary embodiments. The NAL unit, including the SET or the multi-view extension information, may be determined by using an ID nal_unit_type (NUT) indicating a type of the NAL unit. As described above, the SET or the multi-view extension information according to exemplary embodiments may be included in an NAL unit reserved for a future extension or an unused NAL unit.

The receiver 3010 parses the NAL unit, including the SET, to determine scalability of a currently decoded image. If, as shown in FIG. 21, the NAL unit including the SET includes the table index information SET 2110 indicating one of a plurality of SET tables defining available combinations of a plurality of SETs and the layer index information LID 2120 indicating an SET of an encoded image among the combinations of the plurality of SETs included in the plurality of SET tables, the receiver 3010 determines one of the plurality of SET tables according to a value of the table index information SET 2110 and determines one of the combinations of the plurality of SETs from the SET table determined by using the layer index information LID 2120.

If, as shown in FIG. 23, the NAL unit including the SET includes the combined scalable index information SET 2310 and the plurality of pieces of sub layer index information Sub-LID0 and Sub-LID1 2320 and 2330, the receiver 3010 determines to which SET the plurality of pieces of sub layer index information Sub-LID0 and Sub-LID1 2320 and 233 are mapped among a plurality of SETs based on the value of the combined SET 2310, and determines specific mapped SETs according to values of the plurality of pieces of sub layer index information Sub-LID0 and Sub-LID1 2320 and 2330.

The receiver 3010 may parse an NAL unit, including the multi-view extension information, to obtain multi-view information relating to the currently decoded image. The receiver 3010 may obtain an SET indicating which view of image is related to an image included in the NAL unit among a basic view image and an additional view image, the depth flag depth_flag indicating whether the image included in the NAL unit is a texture image or a depth map image and a view ID from a header of the NAL unit. The image decoder 3020 determines whether the image included in the NAL unit is the basic view image or the additional view image based on the SET. As described above, when the SET has 2 bits, "01" indicates the additional view image, and "11" indicates the basic view image, if the depth flag is 0, the image included in the NAL unit is the texture image, the depth flag is 1, and the image included in the NAL unit is the depth map image, the image decoder 3020 may determine which view of the image is the image included in the NAL unit among the basic view image and the additional view image based on the value of the SET. The image decoder 3020 may determine whether the image included in the NAL unit is the texture image or the depth map image based on the obtained depth flag and determine a view of the image included in the NAL unit based on the view ID view_id.

When the TID temporal_id is included in the NAL unit including the basic view image instead of the view ID view_id, the image decoder 3020 may establish the TID by using the TID temporal_id of the basic view image with respect to additional view images that are transmitted by being included in the same access unit as the NAL unit including the basic view image. That is, the image decoder 3020 may establish the TID in such a way that the basic view image and the additional view images included in the same access unit may have the TID temporal_id established with respect to the basic view image.

The image decoder 3020 decodes the image based on the SET or the multi-view extension information to output a scalable image or a multi-view image.

Figure 31:
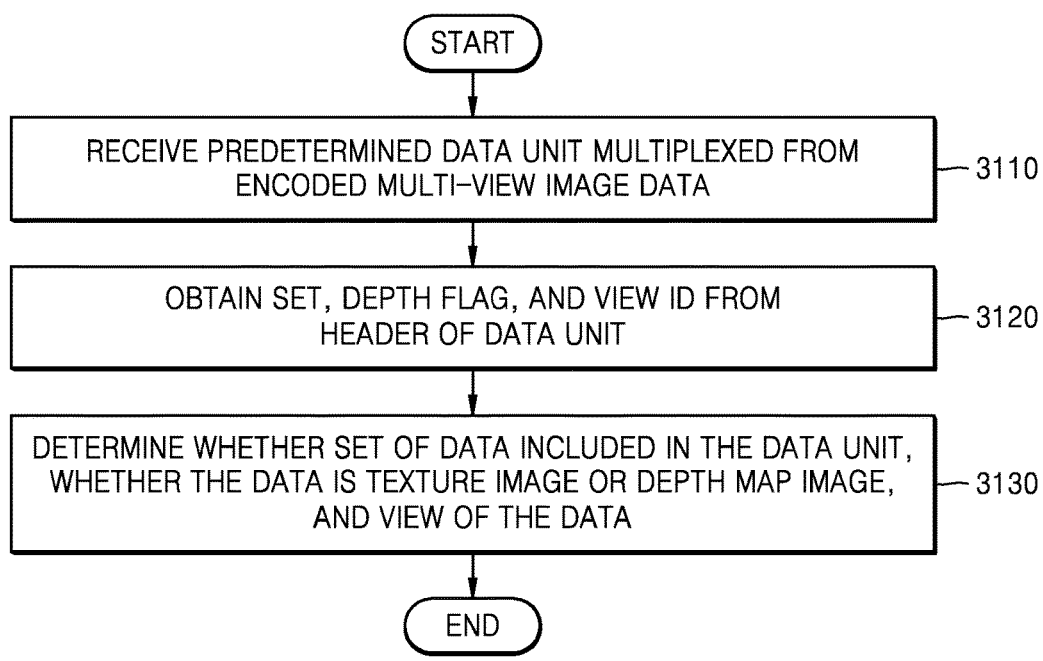
FIG. 31 is a flowchart of a multi-view video decoding method according to an exemplary embodiment.

FIG. 31 is a flowchart of a multi-view video decoding method according to an exemplary embodiment.

Referring to FIG. 31, in operation S3110, the receiver 3010 receives a predetermined data unit that is multiplexed from encoded multi-view image data. In operation S3120, the receiver 3010 obtains an SET indicating which view of image is related to data included in the data unit among a basic view image and an additional view image, a depth flag indicating which image is related to the data included in the data unit among a texture image or a depth map image, and a view information of the data. As described above, the receiver 3010 may obtain an SET indicating which view of image is related to an image included in an NAL unit among the basic view image and the additional view image, a depth flag indicating which image is related to the image included in the NAL unit among the texture image or the depth map image, and a view information of the image from a header of the NAL unit.

In operation S3130, the image decoder 3020 determines an SET of the data included in the data unit, whether the data is the texture image or the depth map image, and a view of the data, based on the obtained information. As described above, the image decoder 3020 determines whether the image included in the NAL unit is the basic view image or the additional view image based on the SET. The image decoder 3020 may determine whether the image included in the NAL unit is the texture image or the depth map image based on the obtained depth flag, and determine the view of the image included in the NAL unit based on the view ID view_id.

When the TID temporal_id is included in the NAL unit including the basic view image instead of the view ID view_id, the image decoder 3020 may establish the TID by using the TID temporal_id of the basic view image with respect to additional view images that are transmitted by being included in the same access unit as the NAL unit including the basic view image.

The image decoder 3020 decodes the image based on the obtained SET or multi-view extension information to output a scalable image or a multi-view image.

The exemplary embodiments may be written as computer programs and may be implemented in general-use digital computers that execute the programs by using a computer-readable recording medium. Examples of the computer-readable recording medium include magnetic storage media (e.g., a read-only memory (ROM), a floppy disc, and a hard disc), optically readable media (e.g., a compact disc-read only memory (CD-ROM) and a digital versatile disc (DVD)), and carrier waves (such as data transmission through the Internet).

While the exemplary embodiments have been particularly shown and described, it will be understood by those of ordinary skill in the art that various changes in form and details may be made therein without departing from the spirit and scope of the exemplary embodiments as defined by the appended claims. The exemplary embodiments should be considered in a descriptive sense only and not for purposes of limitation. Therefore, the scope of the present application is defined not by the detailed description of the invention but by the appended claims, and all differences within the scope will be construed as being included in the present disclosure.

The invention claimed is:

1. A multi-view video encoding method comprising:
encoding a multi-view image included in a multi-view video;
multiplexing the encoded multi-view image by a predetermined data unit; and
adding a scalable extension type (SET) indicating which view of image among a basic view image and an additional view image is included in the predetermined data unit, a depth flag indicating whether a data included in the predetermined data unit is a texture image or a depth map image, and a view identifier (ID) of the data to a header of the predetermined data unit, wherein when the SET indicates that the data included in the predetermined data unit is the basic view image, a temporal identifier of the basic view image is added to the header of the predetermined data unit instead of the view identifier.

2. The multi-view video encoding method of claim 1, wherein the predetermined data unit is a network adaptation layer (NAL) unit.

3. The multi-view video encoding method of claim 1, wherein the SET, the depth flag, and the view ID are added to a reserved region established for a future extension of the header of the NAL unit and a temporal ID (TID) region.

4. A multi-view video encoding apparatus comprising:
a processor; and
a memory storing a program which causes the processor to:
  encode a multi-view image included in a multi-view video; and
  multiplex the encoded multi-view image by a predetermined data unit and add a scalable extension type (SET) indicating which view of image among a basic view image and an additional view image is included in the predetermined data unit, a depth flag indicating whether a data included in the predetermined data unit is a texture image or a depth map image, and a view identifier (ID) of the data to a header of the predetermined data unit,
  wherein when the SET indicates that the data included in the predetermined data unit is the basic view image, a temporal identifier of the basic view image is added to the header of the predetermined data unit instead of the view identifier.

5. A multi-view video decoding method comprising:
receiving a bitstream comprising a predetermined data unit multiplexed from encoded multi-view image data;
obtaining a scalable extension type (SET) indicating which view of image among a basic view image and an additional view image is included in the predetermined data unit, a depth flag indicating whether a data included in the predetermined data unit is a texture image or a depth map image, and a view identifier (ID) of the data from a header of the predetermined data unit; and
determining an SET of the data included in the predetermined data unit, whether the data is the texture image or the depth map image, and a view of the data, based on the obtained information,
wherein when the SET indicates that the data included in the predetermined data unit is the basic view image, obtaining a temporal identifier of the basic view image from the header of the predetermined data unit instead of the view identifier.

6. The multi-view video decoding method of claim 5, wherein the predetermined data unit is a network adaptation layer (NAL) unit.

7. The multi-view video decoding method of claim 5, wherein the SET, the depth flag, and the view ID are included in a reserved region established for a future extension of the header of the NAL unit and a temporal ID (TID) region.

8. The multi-view video decoding method of claim 5, further comprising:
determining a TID of an additional view image transmitted by being included in the same access unit as the predetermined data unit including the basic view image based on the TID of the basic view image.

9. A multi-view video decoding apparatus comprising:
a processor; and
a memory storing a program which causes the processor to:
receive a bitstream comprising a predetermined data unit multiplexed from encoded multi-view image data and obtain a scalable extension type (SET) indicating which view of image among a basic view image and an additional view image is included in the predetermined data unit, a depth flag indicating whether a data included in the predetermined data unit is a texture image or a depth map image, and a view identifier (ID) of the data from a header of the predetermined data unit; and
determine an SET of the data included in the predetermined data unit, whether the data is the texture image or the depth map image, and a view of the data, based on the obtained information,
wherein when the SET indicates that the data included in the predetermined data unit is the basic view image, a temporal identifier of the basic view is obtained from the header of the predetermined data unit instead of the view identifier.

10. The multi-view video decoding apparatus of claim 9, wherein the predetermined data unit is a network adaptation layer (NAL) unit.

11. The multi-view video decoding apparatus of claim 9, wherein the SET, the depth flag, and the view ID are included in a reserved region established for a future extension of the header of the NAL unit and a temporal ID (TID) region.

12. The multi-view video decoding apparatus of claim 9, wherein the image decoder is further configured to determine a TID of an additional view image transmitted by being included in the same access unit as the predetermined data unit including the basic view image based on the TID of the basic view image.

* * * * *